United States Patent
Tohriyama et al.

(10) Patent No.: US 11,307,040 B2
(45) Date of Patent: Apr. 19, 2022

(54) MAP INFORMATION PROVISION SYSTEM

(71) Applicants: TOYOTA JIDOSHA KABUSHIKI KAISHA, Toyota (JP); The University of Tokyo, Tokyo (JP); National University Corporation Tokyo University of Agriculture and Technology, Fuchu (JP); School Judicial Person IKUTOKU GAKUEN, Atsugi (JP)

(72) Inventors: Kyoichi Tohriyama, Yokohama (JP); Takuma Ito, Tokyo (JP); Satoshi Nakamura, Tokyo (JP); Minoru Kamata, Tokyo (JP); Pongsathorn Raksincharoensak, Fuchu (JP); Tsukasa Shimizu, Nagakute (JP); Hideo Inoue, Atsugi (JP)

(73) Assignees: TOYOTA JIDOSHA KABUSHIKI KAISHA, Toyota (JP); THE UNIVERSITY OF TOKYO, Tokyo (JP); National University Corporation Tokyo University of Agriculture and Technology, Fuchu (JP); SCHOOL JUDICIAL PERSON IKUTOKU GAKUEN, Atsugi (JP)

( * ) Notice: Subject to any disclaimer, the term of this patent is extended or adjusted under 35 U.S.C. 154(b) by 130 days.

(21) Appl. No.: 16/640,992

(22) PCT Filed: Oct. 5, 2018

(86) PCT No.: PCT/IB2018/001189
§ 371 (c)(1),
(2) Date: Feb. 21, 2020

(87) PCT Pub. No.: WO2019/069126
PCT Pub. Date: Apr. 11, 2019

(65) Prior Publication Data
US 2020/0225044 A1    Jul. 16, 2020

(30) Foreign Application Priority Data

Oct. 5, 2017 (JP) .............................. JP2017-195280

(51) Int. Cl.
*G01C 21/32* (2006.01)
*G05D 1/02* (2020.01)

(52) U.S. Cl.
CPC ........... *G01C 21/32* (2013.01); *G05D 1/0212* (2013.01); *G05D 2201/0213* (2013.01)

(58) Field of Classification Search
CPC ................. G01C 21/32; G05D 1/0212; G05D 2201/0213
(Continued)

(56) References Cited

U.S. PATENT DOCUMENTS 5,229,941 A * 7/1993 Hattori ................. G05D 1/0217
180/167
6,577,334 B1 * 6/2003 Kawai ................ B60G 17/0165
348/148

(Continued)

FOREIGN PATENT DOCUMENTS

JP     2002062149 A    2/2002
JP     2009109341 A    5/2009
(Continued)

*Primary Examiner* — Yazan A Soofi
(74) *Attorney, Agent, or Firm* — Sughrue Mion, PLLC

(57) ABSTRACT

A map information provision system includes: a road map information database configured to store road map information; a vehicle position determination unit configured to detect and determine a position of a vehicle on a road; a road map information extraction unit configured to extract the road map information around the vehicle from the road map information database, based on the position of the vehicle; and a waypoint map constructor unit configured to determine positions of waypoints and configure a waypoint map that is made up of the plurality of the waypoints, wherein the (Continued)

waypoint map is supplied to a driving support device for the vehicle or a driving control device for the vehicle and is utilized as map information on the planned driving route.

19 Claims, 12 Drawing Sheets

(58) Field of Classification Search
USPC .......................................................... 701/25
See application file for complete search history.

(56) References Cited

U.S. PATENT DOCUMENTS

| | | | | |
|---|---|---|---|---|
| 2002/0165064 | A1* | 11/2002 | Miki | F16H 61/66272 |
| | | | | 477/45 |
| 2003/0023369 | A1* | 1/2003 | Takashima | G01C 21/30 |
| | | | | 701/532 |
| 2015/0198456 | A1* | 7/2015 | Ishikawa | G09B 29/106 |
| | | | | 701/437 |
| 2016/0259335 | A1* | 9/2016 | Oyama | G05D 1/0077 |
| 2016/0334796 | A1* | 11/2016 | Inoue | B60W 30/00 |
| 2018/0328744 | A1* | 11/2018 | Miyake | G08G 1/0141 |
| 2019/0384294 | A1* | 12/2019 | Shashua | G01C 21/32 |
| 2020/0132498 | A1* | 4/2020 | Matsumaru | G08G 1/0969 |
| 2021/0248391 | A1* | 8/2021 | Kizumi | G01C 21/3863 |

FOREIGN PATENT DOCUMENTS

| | | |
|---|---|---|
| JP | 2012073753 A | 4/2012 |
| JP | 2013199241 A | 10/2013 |
| JP | 2014037978 A | 2/2014 |
| JP | 2016162299 A | 9/2016 |
| JP | 2016189084 A | 11/2016 |
| JP | 2016-215733 A | 12/2016 |
| JP | 2016224594 A | 12/2016 |
| JP | 2017-010393 A | 1/2017 |
| JP | 2017073059 A | 4/2017 |
| JP | 2017091370 A | 5/2017 |

* cited by examiner

MAP INFORMATION PROVISION SYSTEM

CROSS REFERENCE TO RELATED APPLICATIONS

This application is a National Stage of International Application No. PCT/IB2018/001189 filed Oct. 5, 2018, claiming priority based on Japanese Patent Application No. 2017-195280 filed Oct. 5, 2017.

BACKGROUND OF THE INVENTION

1. Field of the Invention

The invention relates to a map information provision system.

2. Description of Related Art

In the field of technologies for controlling vehicles, it is proposed to perform driving support or driving control through the use of map information on a driving course of a vehicle or roads. For example, in Japanese Patent Application Publication No. 2016-215733 (JP 2016-215733 A), in a technology of controlling, based on map information, a vehicle such that the vehicle drives along a route from a current position to a destination, it is proposed to generate lane driving map data including a target position of the vehicle, a target orientation of the vehicle and a target vehicle speed of the vehicle based on a steering change point of the vehicle, a vehicle speed target point, a position of the vehicle, a traveling direction of the vehicle, a lane traveling distance from a lane entrance position at which the vehicle enters a lane constituting the route, and the like, which are associated with the map information, and perform steering of the vehicle and/or vehicle speed control based on the lane driving map data, the position of the vehicle, and the lane traveling distance. In Japanese Patent Application Publication No. 2017-010393 (JP 2017-010393 A), there is proposed a constructor as to the technology of generating a map for use in driving support or driving control. In this constructor, with a view to making it possible to accurately generate map data even in the case where there is a measurement error in the absolute position of a vehicle, a plurality of driving course data are accumulated, a deformation amount representing a relative positional relationship between each of pairs of driving course data and other driving course data is calculated as to each of the driving course data, and a deformation amount representing a relative positional relationship between the driving course data and virtual driving course data serving as a reference is estimated based on the deformation amount representing the relative positional relationship and calculated as to each of the pairs. Furthermore, each of the driving course data is deformed in accordance with the deformation amount representing the relative positional relationship to the virtual driving course data serving as the reference, and the plurality of the deformed driving course data are synthesized and registered in the map data. Besides, in recent years, the development and studies of autonomous automatic driving technologies have been underway as one technology of driving support for vehicles. In the driving of such a vehicle according to the technology of automatic driving thereof, it is indispensable to utilize map information on a planned driving route of the vehicle. Therefore, a system that provides map information on roads that can also be utilized in the driving of this vehicle based on automatic driving and/or map information on the planned driving route of this vehicle is expected to be structured.

SUMMARY OF THE INVENTION

As described above, in the case where map information on the roads is utilized in driving support such as automatic driving or the like or driving control of the vehicle, a waypoint map (the arrangement of spots (waypoints) on a route that should be passed by the vehicle) is typically configured along a planned driving route of the vehicle, through the use of this road map information, as map information representing a concrete position of the planned driving route, and driving support or driving control is performed such that the vehicle drives along this waypoint map. In this respect, the related art is configured to use a large volume of high-accuracy road map data (e.g., high-accuracy 3D map data with an error within a range of about several centimeters) accumulated in a large in-vehicle data storage (a data recording medium or device), with a view to configuring the waypoint map with high density. However, the storage capacity of the data storage that can actually be mounted in the vehicle is limited. For example, the high-accuracy 3D road map data that are available under the present circumstances can approximately cover only freeways and some highways, and hardly cover ordinary roads or residential roads.

Besides, in driving support such as automatic driving or the like or driving control through the use of map information, the localize (the self-localize) of an own vehicle with respect to the waypoint map is preferably achievable with the highest possible accuracy. In this respect, according to the related art, self-localize is realized with respect to the waypoint map on which latitudes and longitudes are matched in advance by a system such as a high-accuracy (real-time kinematic global positioning system) RTK-GPS or the like, self-localize is carried out through the use of entire circumference point cloud data measured by a system such as high-accuracy laser imaging detection and ranging (LIDAR) or the like and a simultaneous localization and mapping (SLAM) method, or self-localize is carried out by extracting characteristic points such as features and the like and converting the surrounding environment into a point cloud, etc. Thus, the costs of sensors are high, and large volumes of data are separately needed.

Furthermore, the refining of road map information such as high-accuracy 3D map data or the like as described for enabling the constructor of the high-accuracy waypoint map needs a significant amount of time and high costs. Under the present circumstances, there is a plan to refine such road map information only as to freeways, some highways and the like that constitute only about 2% of all the roads in Japan. In fact, it is difficult to refine road map information such as high-accuracy 3D map data or the like on ordinary roads and residential roads or the like. That is, the high-accuracy 3D map data whose utilization as road map information in driving support such as automatic driving or the like or driving control has been considered under the present circumstances can actually cover a very narrow road range, and it is difficult to utilize the high-accuracy 3D map data in driving support such as automatic driving or the like or driving control over an extensive road range.

By the way, in one aspect of driving support such as automatic driving or the like or driving control of the vehicle, it is conceivable to incorporate a model of driving skills of highly-qualified drivers called proficient drivers into a control system for the driving of the vehicle, realize a driving aspect corresponding to the driving by such highly-qualified drivers by the control system, and thus realize gentle driving with the intention of avoiding risks in the early stages so as not to approach any risks that could happen during driving as is the case with the driving by highly-qualified drivers. In order to achieve such driving support, the external world needs to be recognized over a long distance and with high accuracy, in front in the traveling direction of the vehicle and around the vehicle. In this case, however, the realization of the refining of a large volume of high-accuracy road map information such as high-accuracy 3D map data as described above or the like and high-accuracy self-localize is not considered to be a prerequisite condition. For example, when there is an error of about 1 m in the traveling direction on a driving route in the case where the vehicle is assumed to make a right or left turn at a crossing, there may be a case where part of the vehicle strays into the oncoming driving route after making the right or left turn, but the realization of localize of about 0.5 m or less is sufficient. That is, road map information or road map data that satisfy the requirement of the accuracy in driving support such as automatic driving or the like or driving control as described above and that can cover a more extensive road range than high-accuracy 3D map data would be effectively available in a more extensive road range in driving support such as automatic driving or the like or driving control of the vehicle, even though they are not as accurate as high-accuracy 3D map data.

As road map information that covers a more extensive road range than the high-accuracy 3D map data as described above, car navigation map information (e.g., map data based on the Navigation Data Standard (NDS), map data provided by the Japan Digital Road Map Association (DRM) or the like) is in relatively widespread use. Under the present circumstances, such common car navigation map information has already been refined on 74% of all the roads in Japan. It should be noted, however, that since there may be an error of about several meters in accuracy in the case of common car navigation map information, it is somewhat difficult to directly use this car navigation map information for driving support such as automatic driving or the like or driving control. However, car navigation map data cover a much more extensive road range than high-accuracy 3D map data as described above. Therefore, if new road map information or a new map information provision system that utilizes these car navigation map data in an aspect enabling the enhancement of the accuracy thereof can be structured, the use of the car navigation map data in driving support such as automatic driving or the like or driving control of the vehicle is also considered to be possible.

The invention provides a map information provision system that provides map information to be utilized also in driving support such as automatic driving or the like or driving control of a vehicle and that can provide map information with highest possible accuracy with the aid of car navigation map information.

Besides, the invention provides a map information provision system that provides map information as described above and that configures and provides map information (a waypoint map) indicating a planned driving route of a vehicle through the use of new road map information structured based on car navigation map information.

Furthermore, in the case where the vehicle actually drives on roads along an arbitrary route, if the driving distance of the vehicle, the driving position (e.g., the lateral deviation from the center of the lane) of the vehicle and the like are measured while detecting the presence of crossings and landmarks that are passed by the vehicle in the meantime, the map information on the roads in the route, for example, the information on the positions of the respective crossings, the distances on the roads joining the respective crossings, the positions, directions of curvature, angles and curvature radii of curved roads or winding roads, the positions of the landmarks and the like can be accurately collected based on the detected and measured information on those crossings and landmarks. Then, when such information obtained through actual driving of the vehicle can be reflected by the new road map information structured from car navigation map information as described above, the accuracy of the map information (the waypoint map) indicating the planned driving route of the vehicle is expected to be enhanced.

Thus, the invention provides a map information provision system that provides map information as described above and that updates road map information through the use of information obtained in actual driving of a vehicle.

An aspect of the present invention provides a map information provision system including: a road map information database configured to store road map information including information on a latitude and a longitude that specify a position of each of a plurality of crossings present on roads, information on a road width, a number of lanes, a traveling direction of a vehicle in each of the lanes, positions of a front end and a rear end along the traveling direction of the vehicle at each of the crossings, information on an inter-crossing driving course distance as a driving course distance in each of the lanes between two adjacent ones of the crossings, at each of the crossings, information on a curve constituting point driving course distance as a driving course distance from the front end of the closest crossing located behind in the traveling direction of the vehicle in the traveling direction of the vehicle to each of curve constituting points in each of the lanes, the information specifying a position of each of the curve constituting points, each of which is a spot on a curved road or a winding road as one of the roads, and information on a change in angle and a curvature radius of each of the curve constituting points in each of the lanes, a vehicle position determination unit configured to detect and determine a position of the vehicle on a road; a road map information extraction unit configured to extract the road map information around the vehicle from the road map information database, based on the position of the vehicle; and a waypoint map constructor unit configured to determine, based on a waypoint reference point as the position of the vehicle at an arbitrary time point and the extracted road map information, positions of waypoints that are arranged in front in the traveling direction of the vehicle at predetermined intervals along a planned driving route of the vehicle, through use of waypoint coordinates as X-Y coordinates on a driving course distance plane, that is, a two-dimensional plane where the waypoint reference point serves as an origin, a distance is expressed as a driving course distance, and a direction is expressed as an extension direction of a lane along the planned driving route, and configure a waypoint map that is made up of the plurality of the waypoints, wherein the waypoint map is supplied to a driving support device for the vehicle or a driving control device for the vehicle and is utilized as map information on the planned driving route.

In the above aspect, the vehicle position determination unit may include a vehicle driving course distance determination unit configured to determine, based on the extracted map information, a vehicle driving course distance as a driving course distance from the front end of the closest crossing located behind in the traveling direction of the vehicle in the traveling direction of the vehicle to the position of the vehicle, the vehicle position determination unit may be configured to specify the position of the vehicle by the vehicle driving course distance, and the waypoint map constructor unit may be configured to determine the waypoint coordinates of the plurality of the waypoints through use of the vehicle driving course distance, a driving course distance between the front end and the rear end along the traveling direction of the vehicle at each of the crossings present on the lanes along the planned driving route in the extracted road map information, inter-crossing driving course distances among the respective crossings present in the lanes along the planned driving route, curve constituting point driving course distances to the curve constituting points present in the lanes along the planned driving route, and changes in angle and curvature radii of the curve constituting points.

In the above aspect, the road map information may include information on a landmark driving course distance as a driving course distance from the front end of the closest crossing located behind in the traveling direction of the vehicle in the traveling direction of the vehicle to a landmark present on a road, the information specifying a position of the landmark, and the vehicle driving course distance determination unit may be configured to correct the vehicle driving course distance based on the landmark driving course distance to the landmark and a distance between the landmark and the vehicle, when the vehicle detects the landmark.

In the above aspect, the landmark may be at least one of a stop line on a road surface, a crosswalk, a traffic light, a stop sign, and a speed limit sign.

In the above aspect, the waypoint map constructor unit may be configured to determine, based on newly extracted road map information, positions of new waypoints that are arranged in front in the traveling direction of the vehicle at predetermined intervals along the planned driving route of the vehicle, through use of the waypoint coordinates, and add the positions of the new waypoints to the waypoint map, when the road map information extraction unit extracts the road map information within a new range as the position of the vehicle moves.

In the above aspect, the waypoint map constructor unit may be configured to update the waypoint reference point to a position of the vehicle afterward at an arbitrary time point, when a driving travel distance of the vehicle exceeds a predetermined distance.

In the above aspect, the waypoint map constructor unit may be configured to determine a position of each of the waypoints through use of the waypoint coordinates and a waypoint driving course distance as a cumulative driving course distance from the waypoint reference point.

The above aspect may further include a driving log recording unit configured to record a driving log including an actual vehicle driving course distance as an actual driving distance from a driving trajectory reference point as the position of the vehicle at an arbitrary time point, a lateral deviation as a distance between a centerline of a lane in which the vehicle is driving and the position of the vehicle, a vehicle speed, and a yaw rate, at each of recording points that are arranged at predetermined intervals, during driving of the vehicle; a driving trajectory generation unit configured to generate a driving trajectory in an arbitrary lane between two arbitrary crossings that are adjacent to each other through use of a normal driving log as the driving log that does not include an abnormal value in the lateral deviation and that relates to the vehicle that has driven by being driven by a driver himself or herself in a same direction in the arbitrary lane between the two arbitrary crossings that are adjacent to each other; a lane leading end and terminal end position determination unit configured to determine positions of a leading end and a terminal end of the arbitrary lane between the two arbitrary crossings that are adjacent to each other in the normal driving log, through use of the actual vehicle driving course distance in the normal driving log, based on information on a position of a front end or rear end of each of the two arbitrary crossings that are adjacent to each other along a driving direction of the vehicle as accumulated in the road map information database, on a driving trajectory plane as a two-dimensional plane where the driving trajectory reference point serves as an origin, the distance is expressed as a driving course distance, and the direction is expressed as a direction in which the vehicle has driven; a driving trajectory recording unit configured to determine a position of a lane center point positioned on a centerline of the arbitrary lane between the leading and terminal ends of the arbitrary lane on the driving trajectory plane, by referring to the lateral deviation, the vehicle speed and the yaw rate, which have been recorded in the normal driving log, in such a manner as to correspond to each of the recording points of the normal driving log, and record a plurality of the positions of the lane center points as a driving trajectory between the leading and terminal ends of the arbitrary lane; and a road map information correction unit configured to correct the road map information accumulated in the road map information database, based on the driving trajectories whose number has reached a predetermined number, when a number of the driving trajectories in the arbitrary lane has reached the predetermined number.

In the above aspect, the driving trajectory generation unit may be configured to calculate a length of the driving trajectory between the leading and terminal ends of the arbitrary lane between the two arbitrary crossings that are adjacent to each other, as an actual inter-crossing driving course distance in the arbitrary lane between the two arbitrary crossings that are adjacent to each other, and the road map information correction unit may be configured to update the inter-crossing driving course distance in the arbitrary lane between the two arbitrary crossings that are adjacent to each other as accumulated in the road map information database, to an average of the actual inter-crossing driving course distances on the driving trajectories for whose number has reached the predetermined number.

The above aspect may further include a driving log recording unit configured to record a driving log including am actual vehicle driving course distance as an actual driving distance from a driving trajectory reference point as a position of the vehicle at an arbitrary time point, a lateral deviation as a distance between a centerline of a lane in which the vehicle is driving and the position of the vehicle, and information indicating presence of a landmark in association with the actual vehicle driving course distance when the vehicle detects the landmark, during driving of the vehicle; and a road map information correction unit configured to update the landmark driving course distance to a landmark commonly detected in the normal driving logs whose number has reached the predetermined number as recorded in the road map information database, to an average of values each obtained by subtracting the actual vehicle driving course distance from the landmark to the front end of the closest crossing located behind in the traveling direction of the vehicle in the traveling direction of the vehicle from the actual vehicle driving course distance at a time when the landmark is detected in the normal driving logs whose number has reached the predetermined number, when the number of normal driving logs, which are driving logs each of which does not include an abnormal value in the lateral deviation and relates to the vehicle that has driven by being driven by the driver himself or herself in the same direction in the arbitrary lane between the two arbitrary crossings that are adjacent to each other, reaches the predetermined number.

In the above aspect, the road map information correction unit may be configured, in a case where there are a plurality of landmarks in the arbitrary lane between the two arbitrary crossings that are adjacent to each other, to update the landmark driving course distance to one of the second and following landmarks from the crossing on a leading end side of the arbitrary lane as recorded in the road map information database, to a distance that is given by adding the landmark driving course distance to the preceding landmark from the crossing on the leading end side to an actual driving distance between the landmark and the preceding landmark from the crossing on the leading end side.

The above aspect may further include a driving log recording unit configured to record a driving log including an actual vehicle driving course distance as an actual driving distance from a driving trajectory reference point as a position of the vehicle at an arbitrary time point, a lateral deviation as a distance between, a centerline of a lane in which the vehicle is driving and the position of the vehicle, a vehicle speed of the vehicle, a yaw rate of the vehicle, and information indicating presence of a curve constituting point in association with the actual vehicle driving course distance when the curve constituting point is detected during driving of the vehicle, during driving of the vehicle; and a road map information correction unit configured to update a change in angle and a curvature radius of a curve constituting point commonly detected in normal driving logs whose number has reached a predetermined number as recorded in the road map information database, based on a change in angle and a curvature radius that are determined from the vehicle speed and the yaw rate within a predetermined distance range from a corresponding curve constituting point in each of the normal driving logs whose number has reached the predetermined number along a driving direction of the vehicle, when the number of normal driving logs, which are driving logs each of which does not include an abnormal value in the lateral deviation and relates to the vehicle that has driven by being driven by the driver himself or herself in the same direction in the arbitrary lane between the two arbitrary crossings that are adjacent to each other, reaches the predetermined number.

In the above aspect, the road map information correction unit may be configured to update the curvature radius of the curve constituting point commonly detected in the normal driving logs whose number has reached the predetermined number as recorded in the road map information database, to an average of curvature radii that are each obtained by dividing the vehicle speed by the yaw rate in the normal driving logs whose number has reached the predetermined number within the predetermined distance range from the corresponding curve constituting point along, the driving direction of the vehicle, in the normal driving logs whose number has reached the predetermined number, and update a change in angle of the curve constituting point commonly detected in the normal driving logs whose number has reached the predetermined number as recorded in the road map information database, to an average of changes in yaw angle of the vehicle, which are each obtained by integrating yaw rates in the normal driving logs whose number has reached the predetermined number from the corresponding curve constituting point to a subsequent curve constituting point, in the normal driving logs whose number has reached the predetermined number.

In the above aspect, the driving log recording unit may be configured to further record an actual in-crossing landmark driving course distance, that is, an actual driving distance from the driving trajectory reference point to a crosswalk or a stop line, as the driving log, in a case where the crosswalk or the stop line exists in the two arbitrary crossings that are adjacent to each other, and the lane leading end and terminal end position determination unit may be configured to determine the position of the leading end or terminal end of the arbitrary lane as a position that is obtained by adding the actual in-crossing landmark driving course distance to a distance between a position of the crosswalk or stop line detected in the crossings and the position of the front end along the traveling direction of the vehicle.

In the above aspect, the lane leading end and terminal end position determination unit may be configured to determine the position of the leading end or terminal end of the arbitrary lane, as a position where the curvature that is obtained by dividing the yaw rate by the vehicle speed along the traveling direction of the vehicle in the two arbitrary crossings that are adjacent to each other changes from a value equal to or larger than a predetermined value to a value equal to or smaller than the predetermined value.

In the above aspect, the road map information correction unit may be configured to calculate averages of angles and curvature radii within a range of a right or left turn of the vehicle in the driving trajectories whose number has reached a predetermined number, respectively, based on a vehicle speed and yaw rate of the vehicle in the crossing on a terminal end side in the driving trajectories whose number has reached the predetermined number, in a case where the number of driving trajectories where the vehicle makes the right or left turn at the crossing on the terminal end side of the arbitrary lane between the two arbitrary crossings that are adjacent to each other reaches the predetermined number, configure a waypoint map in the crossing on the terminal end side through use of the calculated averages of the angles and curvature radii within the range of the right or left turn of the vehicle and road map information on the crossing on the terminal end side as accumulated in the road map information database, match the position of the stop line in each of the driving trajectories in the crossing on the terminal end side whose number has reached the predetermined number with the position of the stop line in the waypoint map in the crossing on the terminal end side, match an orientation of a route immediately preceding the right or left turn of the vehicle in each of the driving trajectories in the crossing on the terminal end side with an orientation of a route immediately preceding the right or left turn of the vehicle on the waypoint map in the crossing on the terminal end side, and determine a starting position of the right or left turn on the waypoint map in the crossing on the terminal end side at a time when the position of the waypoint map in the crossing on the terminal end side is translated such that a sum of squares of a deviation between a route after the right or left turn of the vehicle on the waypoint map in the crossing on the terminal end side and a route after the right or left turn of the vehicle on each of the driving trajectories in the crossing on the terminal end side is minimized, as the starting position of the right or left turn in the crossing on the terminal end side, and update road map information on the crossing on the terminal end side as accumulated in the road map information database, through use of the position specified as the starting position of the right or left turn in the crossing on the terminal end side, and the averages of the angles and curvature radii within the range of the right or left turn of the vehicle.

Other objects and advantages of the invention will become apparent from the following description of a preferred embodiment of the invention.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Constructor of Vehicle

Figure 1A:
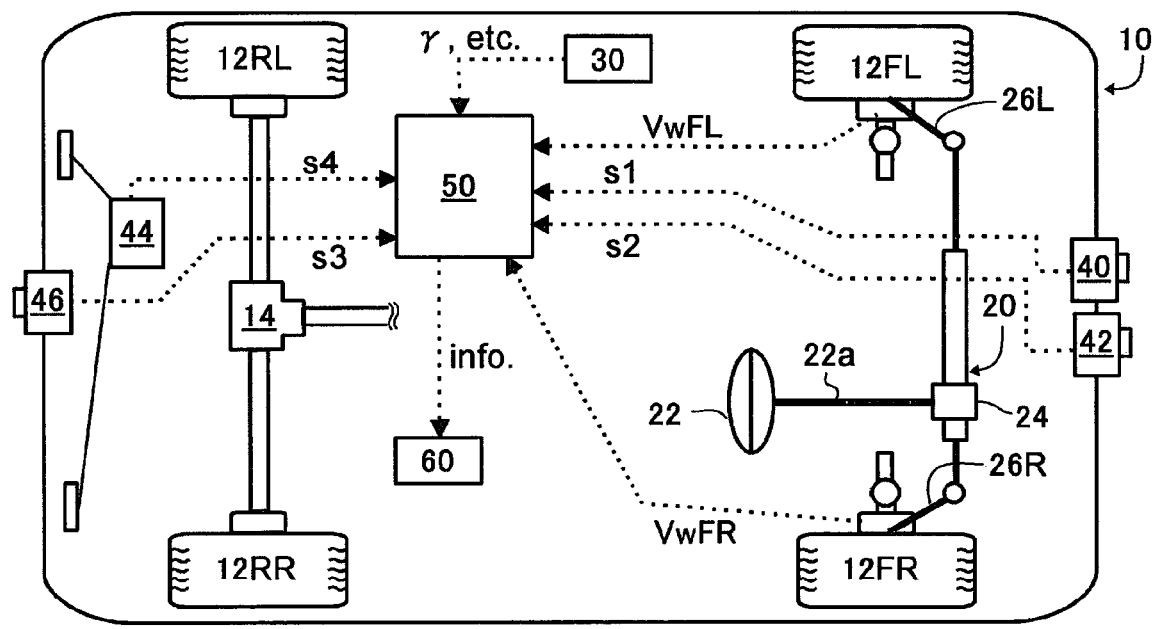
FIG. 1A is a schematic view of a vehicle that is mounted with a map information provision system according to the preferred embodiment of the invention.

Referring to FIG. 1A, a vehicle 10 such as an automobile or the like, which is mounted with a map information provision system according to the preferred embodiment of the invention, is generally mounted with a front-right wheel 12FR, a front-left wheel 12FL, a rear-right wheel 12RR, a rear-left wheel 12RL, a drive system device (only partially shown) that generates a braking/driving force in each of the wheels (only the rear wheels because the vehicle is a rear-wheel-drive vehicle in the illustrated example, but the vehicle may be a front-wheel-drive vehicle or a four-wheel-drive vehicle) in accordance with depression of an accelerator pedal by a driver, a steering device 20 for controlling steering angles of the front wheels (a steering device for the rear wheels may be further provided), and a braking system device (not shown) that generates a braking force in each of the wheels. The drive system device may be generally configured such that a driving torque or a rotational force is transmitted to the rear wheels 12RR and 12RL from an engine and/or an electric motor (not shown, but a hybrid drive device having both an engine and an electric motor may be employed) via a transmission (not shown) and a differential gear device 14. As the steering device 20, a power steering device that turns the front wheels 12FR and 12FL by transmitting rotation of a steering wheel 22 that is steered by the driver to tie rods 26R and 26L while boosting the steering torque by a booster device 24 may be adopted.

Still further, the vehicle 10 to which a driving support control device according to the preferred embodiment of the invention is applied may be provided with an in-vehicle front camera 40, a rear camera 46, a radar device 42 or the like, and a GPS device 44. The cameras 40 and 46 and the radar device 42 or the like are designed to detect a situation around the vehicle and various landmarks present on roads, for example, stop lines, stop line marks, crosswalks, traffic lights, traffic signs such as halt signs, speed limit signs and the like, white lines (or yellow lines) on the roads, other vehicles, obstacles and the like. The GPS device 44 acquires various pieces of information such as information on the position of the own vehicle and the like, through communication with a GPS artificial satellite.

Operation control of the respective units of the above-mentioned vehicle and the operation of the map information provision system according to the invention are performed by a computer 50. The computer 50 may include a drive circuit and a normal-type microcomputer having a CPU, a ROM, a RAM, and an input/output port device that are coupled to one another by a bidirectional common bus. The constructor and operation of the map information provision system according to the invention, which will be described later, may be realized respectively through the operation of the computer 50 according to a program. Wheel speeds VwFR and VwFL from wheel speed sensors (not shown), a yaw rate γ and/or a lateral acceleration Yg from a gyro sensor 30, pieces of information s1 to s4 and the like from the in-vehicle front camera 40, the rear camera 46, the radar device 42 or the like, and the GPS device 44 or the like are input to the computer 50. In an aspect that will be described later, map information that is utilized for driving support or driving control is generated and output to a driving support device or a driving control device. Incidentally, although not shown in the drawing, various parameter signals required for various kinds of control that should be performed in the vehicle according to the present embodiment may be input to the computer 50, and various control commands may be output from the computer 50 to corresponding devices respectively. Besides, a display 60 for receiving car navigation map information and map information info. generated by the map information provision system according to the invention from the computer 50 and providing the driver therewith may be provided for driving support or driving control.

Constructor and Operation of Map Information Provision System

A. General Constructor of System

Figure 1B:
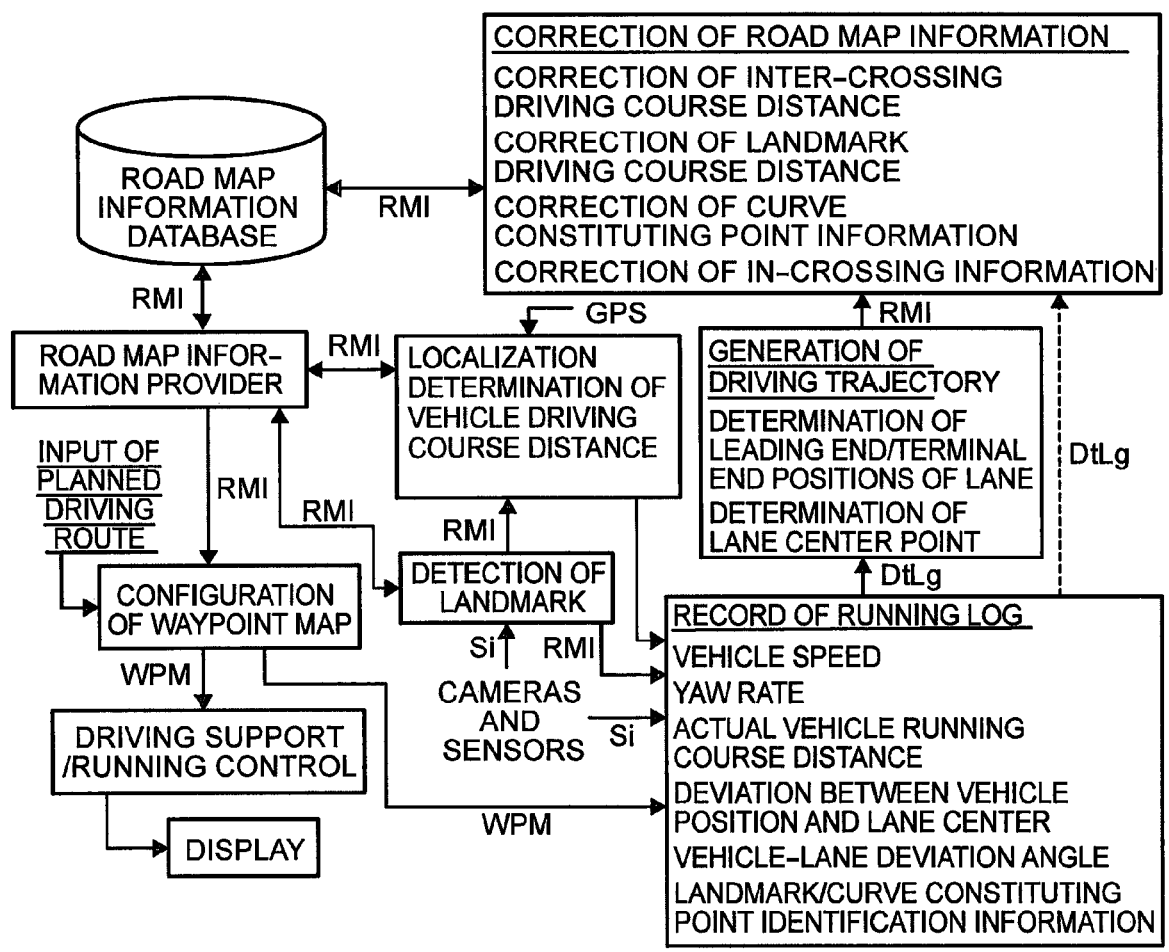
FIG. 1B is a view representing the constructor of the map information provision system according to the embodiment of the invention in the form of a block diagram.

Referring to FIG. 1B, first of all, in the constructor of the map information provision system according to the present embodiment, "a road map information database", "an localization unit", "a road map information provider", "a waypoint map constructor unit" and "a landmark detection unit" are provided as a constructor for providing map information that is utilized for driving support or driving control of the vehicle.

In simple terms, "the road map information database" is a database in which information RMI that is utilized to prepare the map information that is utilized for driving support or driving control of the vehicle is accumulated. The information RMI consists of pieces of information on structures present on roads and linearity of the roads, namely, information on crossings as will be described later in detail, information on curve constituting points, information on landmarks, and the like. The information (the road map information) that is accumulated in the road map information database is primarily car navigation map information (map information that is accumulated in a common car navigation system) and map information that is derived from such pieces of information, but can be updated based on information that is obtained through the actual driving of the vehicle, as will be described later. Thus, map information that is more accurate than car navigation map information and information obtained therefrom can be provided.

"The localization unit" is a means for detecting a position of the vehicle and may acquire the piece of information s4 from the GPS device and detect an approximate position (an approximate latitude and an approximate longitude) of the vehicle and an approximate orientation of the vehicle in a state where the position of the vehicle has not been detected, for example, before the start of the driving of the vehicle. Besides, as will be described later, when a landmark is detected during the driving of the vehicle, "the localization unit" corrects the position of the vehicle with reference to a landmark driving course distance to the detected landmark.

"The road map information provider" is a means for extracting the road map information RMI in the vicinity of the position of the vehicle, namely, within a predetermined range around the detected position of the vehicle (e.g., within a range of 400 m therearound) from the road map information database, with reference to the position of the vehicle. Incidentally, the road map information provider may successively extract road map information within a range that is included into the predetermined range around the detected position of the vehicle as the position of the vehicle moves, during the driving of the vehicle. Besides, the foregoing "localization unit" may preferably be configured to calculate a driving course distance (a vehicle driving course distance) from a front end of the closest crossing located behind in a traveling direction of the vehicle in the traveling direction of the vehicle with reference to positions (latitudes and longitudes) of crossings around the position of the vehicle among the pieces of information RMI extracted by the road map information provider, and determine the position of the vehicle (it should be noted, however, that the position of the vehicle is determined as a tentative value because the accuracy of the vehicle driving course distance is low in the state where the position of the vehicle is determined in accordance with the information from the GPS device).

"The landmark detection unit" detects a landmark from the pieces of information s1 to s3 that are obtained by the cameras, sensors and the like, collates the detected landmark with landmark identification information in the information extracted by the road map information provider, and specifies the detected landmark and the landmark driving course distance thereto, during the driving of the vehicle. Then, the specified landmark driving course distance is referred to by the localization unit, and the vehicle driving course distance is corrected based on the landmark driving course distance.

"The waypoint map constructor unit" configures a waypoint map based on the position of the vehicle or the vehicle driving course distance, the extracted road map information and a planned driving route. In an aspect as will be described later in detail, the waypoint map may be configured by arranging waypoints at predetermined intervals on roads including crossings, lanes and the like selected to be passed by the vehicle along the planned driving route. Then, the configured waypoint map is transmitted to the driving support device and/or the driving control device and utilized for driving support or driving control. Incidentally, the planned driving route may be set by, for example, the driver of the vehicle, a user of the system or the like. Alternatively, the planned driving route may be automatically set by the driving support device and/or the driving control device when the driver of the vehicle sets a destination of the vehicle.

In the present embodiment, the driving support device and/or the driving control device may perform driving support and driving control in an arbitrary aspect that aims at causing the vehicle to drive along the waypoint map. For example, in the case of driving based on complete automatic driving, automatic steering/acceleration/deceleration control of the vehicle is performed in principle such that the vehicle passes the respective waypoints on the waypoint map. Besides, in driving support in an aspect for guiding the driving of the vehicle along the waypoint map, the driver himself or herself may steer the vehicle, and the driving support device may perform control for advising the driver, providing guidance on a steering amount and an acceleration/deceleration amount etc. such that the vehicle drives along the waypoint map to the maximum possible extent.

Besides, in the map information provision system according to the present embodiment, as mentioned already, there may be provided a constructor that updates the road map information that is accumulated in the road map information database to more accurate information through the use of information obtained at the time of the actual driving of the vehicle on roads, namely, a driving log. "A driving log recording unit", "a driving trajectory generation unit" and "a road map information correction unit" may be provided as the constructor for updating the road map information. "The driving log recording unit" records parameters that will be described later in detail, such as an actual vehicle driving course distance and the like, as a driving log DtLg, during the driving of the vehicle. In particular, information WPM on the waypoints may also be recorded as the driving log DtLg during the driving of the vehicle according to driving support/driving control through the use of the waypoint map. "The driving trajectory generation unit" generates and records a centerline of a lane in which the vehicle has actually drive (a driving trajectory) through the use of the driving log DtLg recorded by the driving log recording unit. "The road map information correction unit" calculates or determines more accurate road map information with reference to the driving trajectory or the driving log DtLg, and updates the corresponding road map information RMI that is accumulated in the road map information database into that information.

B. Structure of Road Map Information

As mentioned already, the road map information that is accumulated in "the road map information database" in the map information provision system according to the present embodiment may include information on crossings present on roads, information on curve constituting points, and information on landmarks. The respective items of road map information in the present embodiment will be described hereinafter.

Figure 2A:
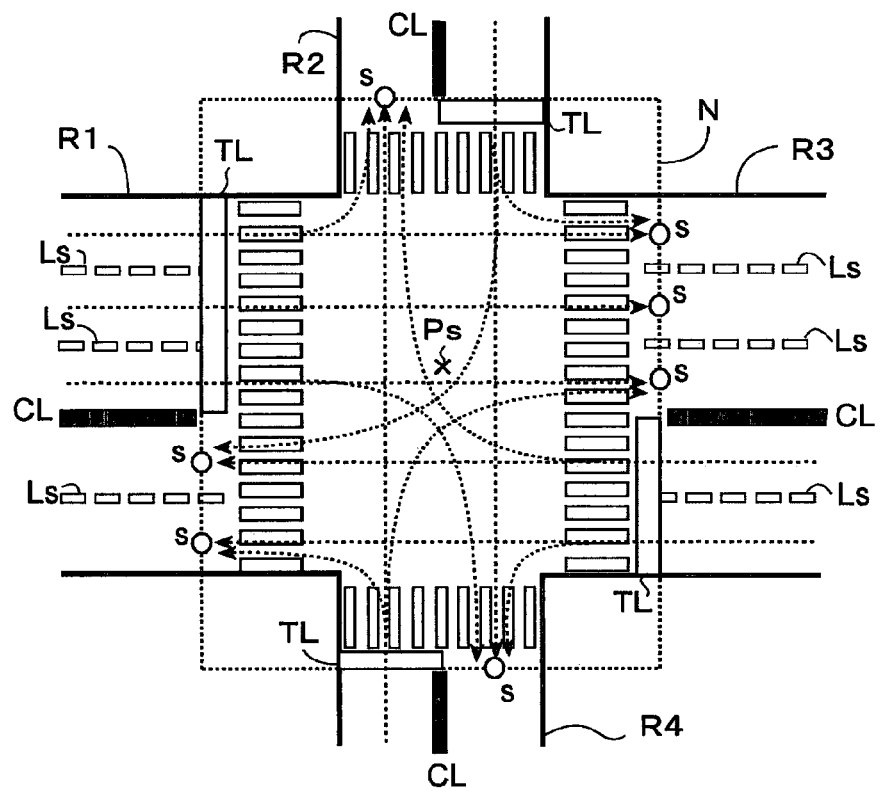
FIG. 2A is a schematic view of a modeled crossing as one of component elements of road map information in the map information provision system according to the embodiment of the invention.

In road map information in the present embodiment, first of all, each of "the crossings" is a spot where at least two roads intersect with each other or merge with each other. Trifurcate roads, T-junctions, crossroads, penta-forked roads and the like are all included in "the crossings". The position of each of the crossings is specified as the latitude and longitude with respect to an arbitrary reference spot Ps that is set for each of the crossings. Then, the structure of each of the crossings is molded through the use of information on road widths, the number of lanes, a traveling direction of the vehicle in each of the lanes and the like. In modeling the crossings, in concrete terms, as schematically depicted in FIG. 2A, a median strip line CL and lane separation lines Ls of roads R1 to R4 that are connected to one crossing are specified from information on road widths, the number of lanes and the traveling direction of the vehicle in each of the lanes as to the roads R1 to R4. In the drawing, as indicated by dotted lines, each of driving courses along which the vehicle travels into another road after driving straight or making a right or left turn from each of the lanes of each of the roads R1 to R4 is specified. Besides, positions outside stop lines TL and the like in the crossing are specified as a border of a range N of the crossing. A spot of entrance into the crossing on each of the driving courses on the border of the range N is specified as a rear end in the traveling direction of the vehicle, and a spot (s) of exit from the crossing on each of the driving courses on the border of the range N is specified as a front end in the traveling direction of the vehicle. Each of the positions of the border of the range N may be specified as a distance from the reference spot Ps whose latitude and longitude are specified. Incidentally, the spots (s) of exit from the crossing are leading and terminal ends of "links" and "lanes" that will be described later. In the case where there is no landmark such as the stop lines TL or the like in the crossing, spots where the curvature changes from a value equal to or smaller than a predetermined value (e.g., 0.01 (m$^{-1}$)) to a value equal to or larger than the predetermined value and spots where the curvature changes from a value equal to or larger than the predetermined value to a value equal to or smaller than the predetermined value may be specified as the border of the range N of the crossing, along the driving course along which the vehicle makes a right or left turn from each of the roads into a road adjacent thereto. In road map information in the present embodiment, the crossings are referred to as "nodes".

Figure 2B:
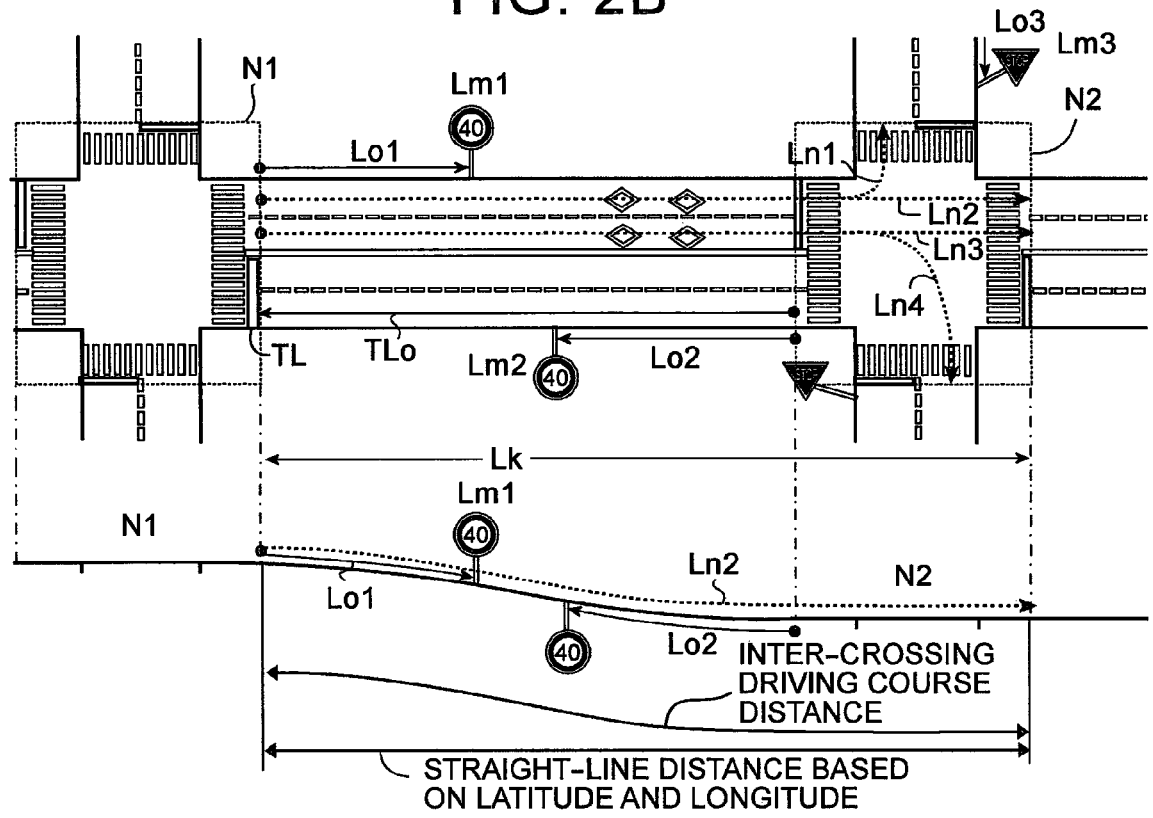
FIG. 2B is a view illustrating the definition of the component elements of the road map information in the map information provision system according to the embodiment of the invention and consisting of an upper view (an upper stage) and a lateral view (a lower stage), which schematically represent two adjacent crossings and a road therebetween.

Subsequently, referring to FIG. 2B, a road Lk between two adjacent nodes (crossings) N1 and N2 modeled as modeled above are referred to as "a link". A starting point of the link Lk is specified as a front end of the node (N1) located behind in the traveling direction of the vehicle, and an end point of the link Lk is specified as a front end of the node (N2) located in front in the traveling direction of the vehicle. Then, each of driving courses (a right or left turn and straight traveling) Ln1 to Ln4 that can be taken by the respective lanes on the link Lk is referred to as "a lane". The driving course distance in each of the lanes Ln1 to Ln4, namely, the driving course distance from the front end of the node N1 located behind in the traveling direction of the vehicle to the front end of the node N2 located in front in the traveling direction of the vehicle in each of the lanes is specified as "an inter-crossing driving course distance". Incidentally, it should be noted herein that "the driving course distance" means a distance that is actually covered by the driving vehicle, namely, a net distance by which the vehicle moves along a road surface as described in the section of "summary of the invention" as well. Accordingly, as depicted in the lower stage of FIG. 2B, if there is a difference in height (altitude) between the node N1 and the node N2 and the link Lk has a gradient, the inter-crossing driving course distance is a distance along a surface of the driving course between the node N1 and the node N2. This distance is longer than a straight-line distance between the node N1 and the node N2 in the case where the positions of the node N1 and the node N2 are specified as latitudes and longitudes.

Besides, in the case where there are "landmarks" such as speed limit signs Lm1 and Lm2, a halt sign Lm3, the stop lines TL and the like on the link Lk, the position of each of the landmarks is specified as a landmark driving course distance, namely, a driving course distance from the front end of the closest crossing located behind in the traveling direction of the vehicle in the traveling direction of the vehicle, in road map information in the present embodiment. For example, the landmark driving course distances to the speed limit signs Lm1 and Lm2 are specified as distances Lo1 and Lo2 along the surface of the driving course, respectively. Besides, the position of the stop line TL within the certain node N1 is also specified in the same manner as a driving course distance TLo from the front end of the closest node N2 located behind in the traveling direction of the vehicle in the traveling direction of the vehicle. "The landmarks" may encompass stop lines on road surfaces, stop line marks, crosswalks, traffic lights, halt signs, speed limit signs, and other traffic signs.

Figure 3A:
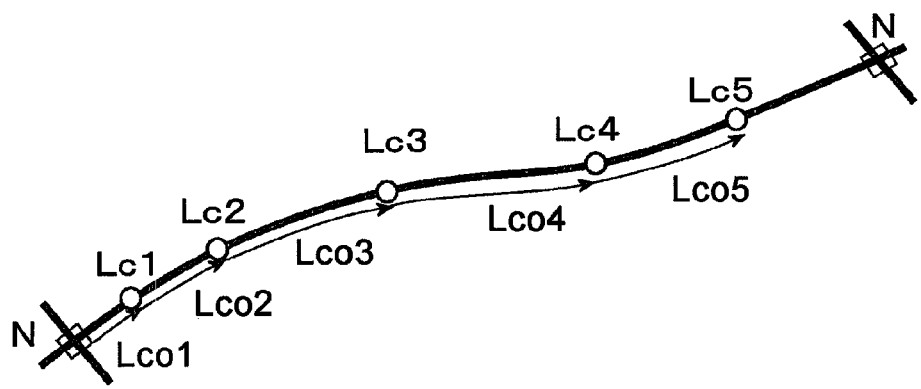
FIG. 3A is a schematic view showing a curved road between two adjacent crossings and illustrating curve constituting points that are set on the curved road.

In the case where the link Lk between two adjacent nodes is a curved or winding road, some spots Lc1 to Lc5 are specified as "curve constituting points" on the link Lk so as to represent the road linearity thereof, and information on the change in angle and the curvature radius at each of the spots (information indicating the road linearity) is imparted to each of the curve constituting points, as schematically depicted in FIG. 3A. Incidentally, each of the curve constituting points to which information on the road linearity has been imparted may also be referred to as "a link constituting point". Moreover, in road map information in the present embodiment, the position of each of the curve constituting points is also specified as a curve constituting point driving course distance, namely, a driving course distance in each of the lanes from the front end of the closest crossing located behind in the traveling direction of the vehicle in the traveling direction of the vehicle to each of the spots.

Incidentally, pieces of identification information such as identification numbers or the like are assigned to the nodes (the crossings), the driving courses in the nodes, the links, the lanes, the landmarks, the curve constituting points (hereinafter referred to generically as "map elements") in the above-mentioned road map information, respectively. Each of the individual map elements is identified according to its identification information. The road map information regarding each of the individual map elements is recorded in association with the identification information on each of the individual map elements, extracted, and utilized.

In the series of pieces of road map information in the present embodiment described above, the latitudes and longitudes of the nodes (the crossings), the road widths, the number of lanes, the traveling direction of the vehicle in each of the lanes can be utilized in map information of a common car navigation system (car navigation map information). The position outside the stop line TL or the like in each of the nodes for specifying the range N thereof can also be utilized from car navigation map information. Therefore, the information on the above-mentioned modeled nodes can be primarily prepared based on car navigation map information. The inter-crossing driving course distance can be primarily calculated based on car navigation map information, because the latitudes and longitudes of the nodes and the gradient of the link Lk between the nodes are available from car navigation map information. Since the latitudes and longitudes of landmarks can be utilized in car navigation map information, the landmark driving course distance can be calculated based on that information and the information on the closest node located behind in the traveling direction of the vehicle. As for each of the curve constituting points, information on the change in angle and curvature radius of each of the spots can be utilized from car navigation map information, and the latitude and longitude of each of the curve constituting points can be utilized in car navigation map information, so the curve constituting point driving course distance can be primarily calculated based on that information and the information on the closest node located behind in the traveling direction of the vehicle. Thus, the above-mentioned series of pieces of road map information can be primarily prepared based on car navigation map information. Then, as mentioned already, when the vehicle actually drives on each of the roads, more accurate information on the inter-crossing driving course distance, the landmark driving course distance, and the change in angle and curvature radius of each of the curve constituting points is obtained through the use of the information obtained on this occasion. As a result, the accuracy of the above-mentioned series of pieces of road map information is enhanced.

C. Detection of Position of Vehicle

Figure 3B:
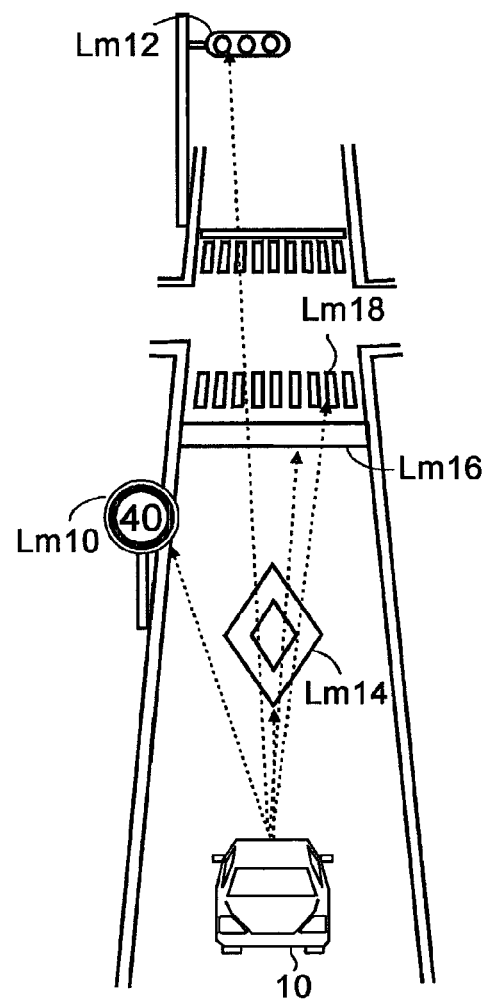
FIG. 3B is a view schematically showing exemplary landmarks that are detected on a road from a driving vehicle.

In the map information provision system according to the present embodiment, as mentioned already, the localization unit specifies the position of the vehicle through the use of positional information (the latitude, longitude and orientation) on the vehicle from the GPS device, in a state where the position of the vehicle on the map has not been detected, for example, before the start of the driving of the vehicle. At this stage, the node located behind in the traveling direction of the vehicle and closest to the position of the vehicle is searched based on the position of the vehicle specified as information from the GPS device, in the road map information accumulated in the road map information database, the driving course distance (the vehicle driving course distance) from the front end of the node in the traveling direction of the vehicle to the current position of the vehicle is calculated, and the position of the vehicle is specified by the vehicle driving course distance. It should be noted, however, that the vehicle driving course distance mentioned herein is information from the GPS device and hence may not be calculated with sufficient accuracy. However, as schematically depicted in FIG. 3B, when the vehicle 10 starts driving, landmarks such as a speed limit sign Lm10, a traffic light Lm12, a stop line mark Lm14, a stop line Lm16, a crosswalk Lm18 and the like are relatively immediately detected by the in-vehicle camera and the radar device, and the distances between those landmarks and the vehicle 10 can be measured. Then, the position of each of the landmarks is specified by the landmark driving course distance (accumulated in the road map information database as described above). Therefore, the driving course distance (the vehicle driving course distance) from the front end of the closest node located behind in the traveling direction of the vehicle in the traveling direction of the vehicle to the position of the vehicle can be calculated with higher accuracy from the distance between the position of each of the landmarks and the current position of the vehicle and the landmark driving course distance. That is, in the map information provision system according to the present embodiment, the position of the vehicle on road map information can be accurately specified by the positional relationship to the landmarks detected after the start of the driving of the vehicle. Incidentally, in the case where the vehicle driving course distance determined based on the positions of the landmarks after the end of the last driving is stored when the vehicle starts driving, the stored vehicle driving course distance may be directly used.

D. Extraction of Road Map Information

In the map information provision system according to the present embodiment, as mentioned already, road map information within a predetermined range around the position of the vehicle, for example, within a range of 400 m around the position of the vehicle is extracted by the road map information provider and utilized to constitute the waypoint map that will be described later. In concrete terms, pieces of information on the latitudes and longitudes of nodes present within the predetermined range around the position of the vehicle, driving courses that can be followed in the respective nodes, the positions of front and rear ends of the respective nodes in the traveling direction of the vehicle, the positions of leading and terminal ends of lanes that can be followed within the predetermined range around the position of the vehicle, the inter-crossing driving distances therebetween, the landmark driving course distances to landmarks present within the predetermined range around the position of the vehicle, and changes in angle and curvatures of curve constituting points may be extracted as road map information, together with identification information on the respective map elements. Incidentally, during the driving of the vehicle, the predetermined range around the position of the vehicle also moves as the position of the vehicle moves. Therefore, the road map information provider adds the above-mentioned road map information as the predetermined range moves.

E. Constructor of Waypoint Map

Figure 4A:
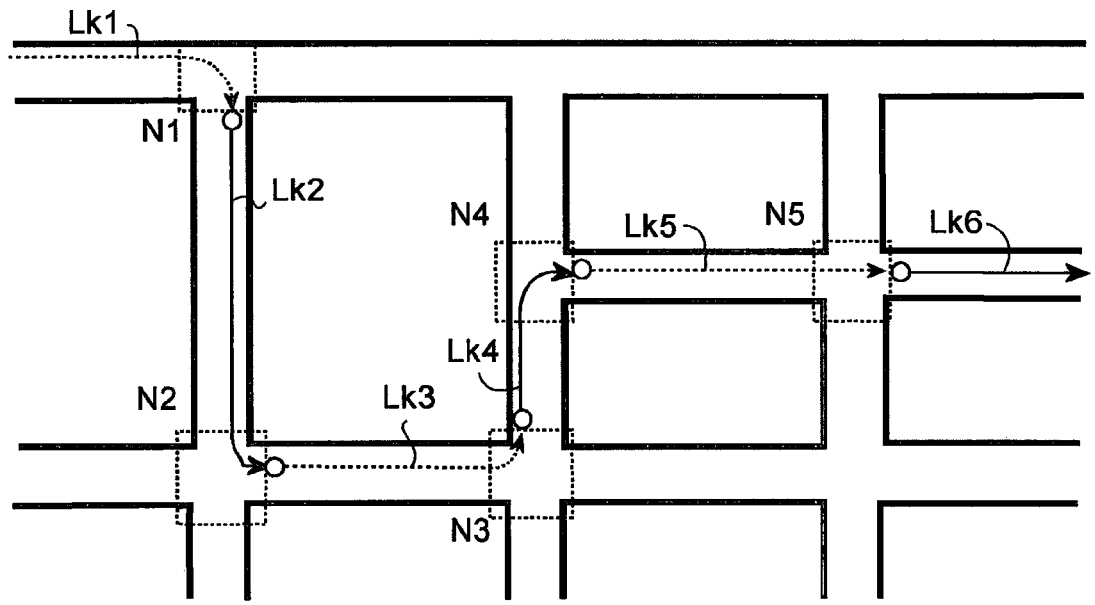
FIG. 4A is a view schematically showing a waypoint map configured by joining lanes on links selected as links to be passed in driving along a planned driving route of the vehicle, in the map information provision system according to the embodiment of the invention.

When road map information within the predetermined range around the position of the vehicle is extracted as described above, the waypoint map is configured as map information on the planned driving route of the vehicle, in the waypoint map constructor unit. In the present embodiment, in the process of configuring the waypoint map, first of all, nodes and links to be passed within the predetermined range around the position of the vehicle are selected along the planned driving route of the vehicle. It should be noted herein that the planned driving route of the vehicle may be determined according to an arbitrary method with reference to the current position of the vehicle and an arbitrarily determined destination, as mentioned already. Then, when the nodes and links to be passed on the planned driving route are selected, the current position of the vehicle is typically determined as an origin of the waypoint map (a waypoint map reference point), lanes are sequentially selected in links that sequentially couple the selected nodes to one another, within a range of extracted road map information from the waypoint reference point, and the selected lanes are joined to one another. FIG. 4A schematically shows how this process progresses. Referring to this drawing, for example, on the assumption that the current position of the vehicle is located on a link Lk1 (it can also be specified from information from the GPS device which link has a lane in which the vehicle is located), N1 to N5 are first selected as nodes to be passed along the planned driving route, and Lk1 to Lk6 are selected as links. After that, lanes to be passed are selected on the links Lk1 to Lk6 respectively and sequentially coupled to one another at the nodes N1 to N5.

Figure 4B:
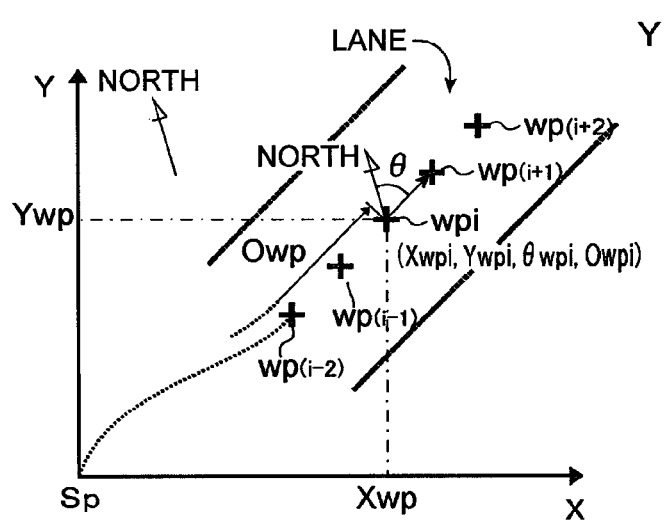
FIG. 4B is a view illustrating waypoints that are determined in the map information provision system according to the embodiment of the invention.

After that, as schematically indicated by "+" in FIG. 4B, waypoints wp are arranged at predetermined intervals in such a manner as to extend along centers of the lanes coupled to one another, so that the waypoint map is configured. In this respect, in the system according to the present embodiment, the waypoint map is configured along the route that is obtained by sequentially joining the plurality of the lanes to one another at the nodes from the waypoint reference point as described above. Therefore, the positions of the respective waypoints are expressed as relative positions from the waypoint reference point. Besides, the length of each of the lanes sequentially coupled to one another is expressed by the corresponding inter-crossing driving course distance, namely, in the unit of driving course distance. The traveling direction of the vehicle in each of the lanes is specified from information on the traveling direction of the vehicle on the driving course in each of the nodes and information on changes in angle and curvatures of curve constituting points. That is, the waypoints that are arranged from each of the nodes selected along the planned driving route to a subsequent one of the nodes are arranged in such a manner as to be located on the centerline of a lane between nodes at intervals of a predetermined driving course distance from the node located behind in the traveling direction of the vehicle toward the node located in front in the traveling direction of the vehicle, along the direction of the lane.

Thus, in the system according to the present embodiment, the position of each of the waypoints wp is expressed as coordinates (Xwp, Ywp) "waypoint coordinates" on a two-dimensional X-Y plane (a driving course distance plane) where a waypoint reference point Sp serves as the origin, the distance is expressed as a driving course distance, and the direction is expressed as an extension direction of the lane, as shown in FIG. 4B. Incidentally, on this X-Y plane, the orientation of the X-axis is typically set as the longitudinal direction of the vehicle (the traveling direction of the vehicle) at the time when the vehicle starts moving, and the orientation of the Y-axis may be perpendicular to the orientation of the X-axis (the lateral direction of the vehicle at the time when the vehicle starts moving) (however, the orientations of the X-axis and the Y-axis are not limited to these directions but may be arbitrarily set, and the orientation of the X-axis may be set as, for example, the extension direction of a lane in which the vehicle is located in configuring the waypoint map). Then, the distance from the waypoint reference point Sp to each of the waypoints wp along the planned driving route is expressed as the sum of the sum of the driving course distances among nodes present on the planned driving route and the driving course distance from the node located behind in the traveling direction of the vehicle and closest to each of the waypoints wp, namely, a cumulative driving course distance (a waypoint driving course distance) Owp from the waypoint reference point Sp. The interval between adjacent ones of the waypoints may be an arbitrarily set interval, for example, an interval of 5 cm. Incidentally, an azimuthal angle θwp of the extension direction of a waypoint row may be determined for each of the waypoints. The azimuthal angle θwp of each of the waypoints may be typically defined as an angle that is formed by a line obtained by linking each of the waypoints with the subsequent waypoint with respect to the northern direction, as shown in the drawing. Accordingly, each of the waypoints may be specified as (Xwpi, Ywpi, θwpi, Owpi) (i denotes an identification sign of the waypoint).

Figure 4C:
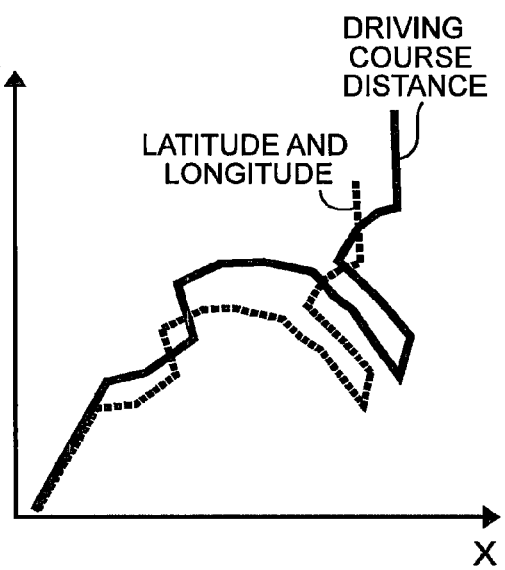
FIG. 4C is a view making a comparison between a waypoint map (indicated by a dotted line) formed on an X-Y coordinate system in which the latitude and longitude in car navigation map information are used and a waypoint map (indicated by a solid line) formed on an X-Y coordinate system in which an inter-crossing driving course distance and the like in the road map information in the map information provision system according to the invention are used, as to a certain planned driving route.

FIG. 4C shows, in an overlapping manner, a case where the positions and extension ranges of nodes and lanes selected such that the vehicle passes a certain planned driving route, namely, an extension route of the waypoint map is expressed in an X-Y coordinate system using the latitude and longitude in car navigation map information (a dotted line—the latitude and longitude) and a case where the extension route of the waypoint map is expressed in an X-Y coordinate system using the driving course distance and the extension direction of the lanes in the map information provision system according to the present embodiment (a solid line—the driving course distance), in configuring the waypoint map by coupling the nodes and the lanes to one another. As is understood by referring to the drawing, the waypoint map expressed through the use of the X-Y coordinate system using the driving course distance has a larger extension region than the waypoint map expressed through the use of the X-Y coordinate system using the latitude and the longitude. This is because the effective distance on an actual driving course surface is longer than a straight-line distance that is determined by a latitude and a longitude, namely, an apparent distance, in the expression of a distance between two certain spots, due to the gradient of each road. That is, it is safe to conclude that a three-dimensional space is virtually converted into a two-dimensional plane by adopting a map in which the distance is expressed in the unit of driving course distance, in the system according to the present embodiment.

Thus, the waypoint map configured as described above is utilized as map information on the planned driving route in driving support and driving control of the vehicle. For example, in the case where the waypoint map is utilized for driving based on automatic driving, the vehicle is controlled in such a manner as to pass the waypoints on the waypoint map. Alternatively, in the case where the driver himself or herself holds the steering wheel to steer the vehicle and the driving support device or the driving control device performs support or control in such a manner as to guide the steering by the driver instead of complete automatic driving, the waypoint map is utilized as map information for providing guidance on the planned driving route by being referred to by the device and/or the driver in guiding steering (in this case, the vehicle may not necessarily pass the waypoints on the waypoint map and is considered to drive substantially at the center of the lane while following the guidance provided by the waypoint map). As in the case of the above-mentioned map information provision system according to the present embodiment, in the case where the waypoint map is expressed as the waypoint coordinates (or the waypoint driving course distance as well as these waypoint coordinates), the distance between two spots on the waypoint map represents a distance that is actually covered by the vehicle, namely, the driving course distance, and the change in orientation on the waypoint map represents a change in orientation of a road on which the vehicle actually drives. Therefore, the waypoint map indicates target values of forward and turning operation amounts, namely, target values of operation amounts in the longitudinal and lateral directions of the vehicle, and hence can be effectively utilized as map information on the planned driving route for automatic driving and driving support. Besides, it should be noted in the waypoint map in the above-mentioned system according to the present embodiment that each of the spots on the planned driving route is specified using the driving course distance from an arbitrary reference point (e.g., the waypoint reference point or a node closest thereto) as relative coordinates instead of being specified through the use of a three-dimensional absolute coordinate system. It should be understood that the processed map information is light, exhibits high availability, and is easily deepened (enhanced in accuracy) as will be described later, owing to this constructor.

By the way, as described already, in the map information provision system according to the present embodiment, road map information is additionally extracted as the position of the vehicle moves. In this case, nodes, links and lanes may be additionally selected along the planned driving route through the use of the additionally extracted road map information, and additional waypoints may be arranged along the centers of those lanes. Besides, the waypoint map of the map information provision system according to the present embodiment adopts the relative coordinates with respect to the waypoint reference point. Therefore, the errors in the waypoint coordinates and the waypoint driving course distance may be accumulated as the driving course distance from this waypoint reference point lengthens. Thus, when the driving travel distance of the vehicle exceeds a predetermined distance, the position of the vehicle at an arbitrary time point may be selected afterward as a new waypoint reference point, and the waypoint driving course distance may be reset to 0 (the update of the waypoint reference point). The waypoint reference point may be updated, for example, when the vehicle first passes a node after the driving travel distance of the vehicle exceeds the predetermined distance.

Furthermore, as described already, in the map information provision system according to the present embodiment, when a landmark on a road is detected, the vehicle driving course distance is corrected based on a landmark driving course distance to the landmark. In this case, there is no need to change the waypoint map ahead of the nodes located in front in the traveling direction of the vehicle. Therefore, only the current position of the vehicle on the waypoint map, namely, only the vehicle driving course distance may be modified instead of updating the configured waypoint map itself.

F. Flow of Operation of System

Figure 5:
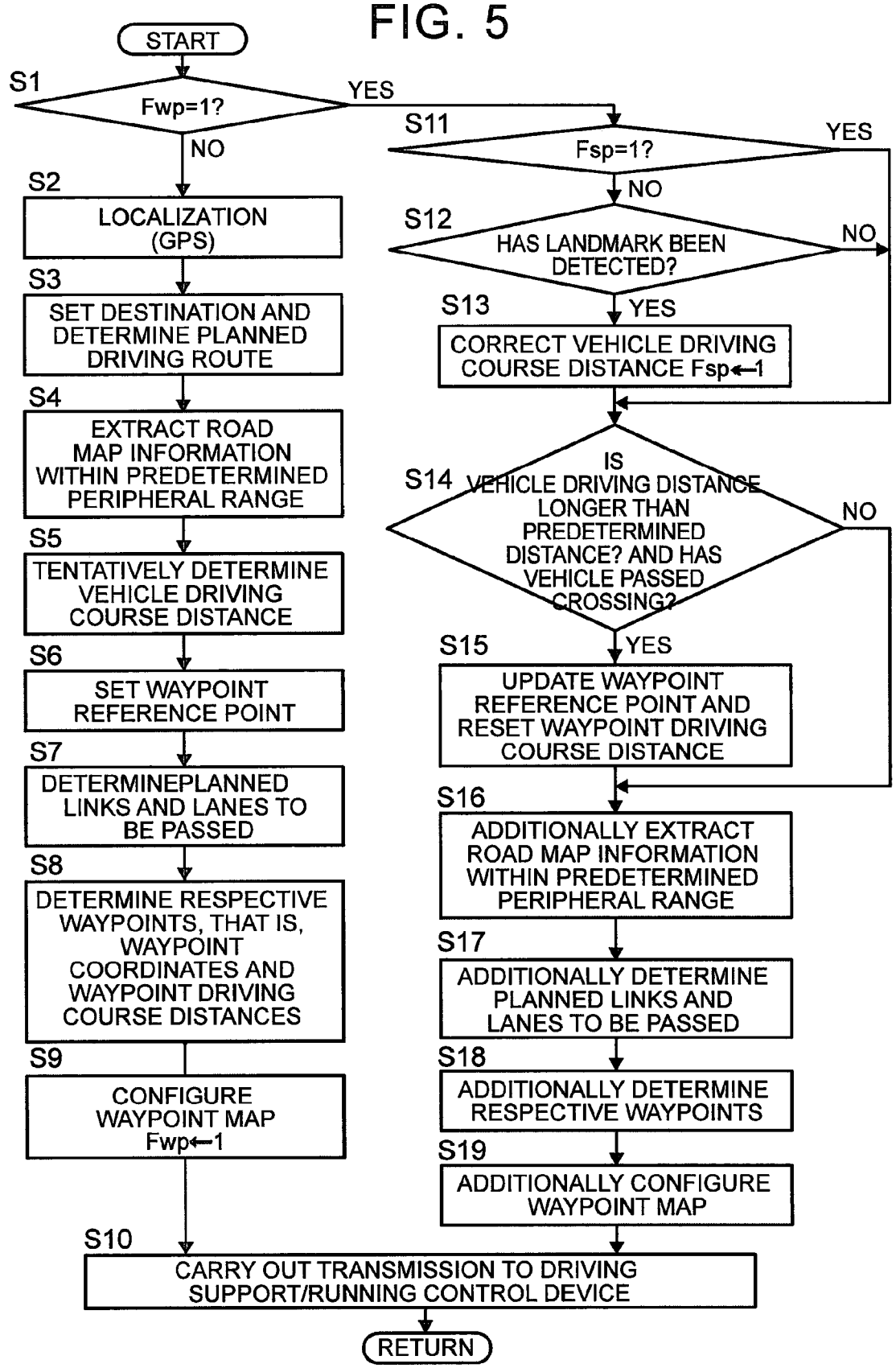
FIG. 5 is a view representing a process of configuring the waypoint map that is provided for driving support and driving control of the vehicle, in the map information provision system according to the embodiment of the invention, in the form of a flowchart.

FIG. 5 represents a process of providing the waypoint map (map information on the planned driving route of the vehicle) in the map information provision system according to the present embodiment, in the form of a flowchart. Incidentally, the process shown in the drawing is repeatedly executed at predetermined time intervals after the start of driving support and/or driving control of the vehicle, through the operation of the computer 50 according to a program. Referring to the drawing, in a waypoint map provision process, it is first determined whether or not a flag Fwp indicating whether or not a waypoint map has already been configured is equal to 1 (step 1). If no waypoint map has been configured, namely, if Fwp≠1, a position of the vehicle is detected through the use of information on the latitude and longitude of the vehicle as GPS information (step 2). Subsequently, when a driving destination of the vehicle is set, a planned driving route is determined from the current position of the vehicle (step 3), road map information within a predetermined range around the detected position of the vehicle is extracted from the road map information database by the road map information provider (step 4), and a vehicle driving course distance at the current position of the vehicle is determined (step 5). It should be noted, however, that the vehicle driving course distance is a tentative value since the current position of the vehicle is based on GPS information at this moment, as mentioned already.

Then, when the vehicle driving course distance is determined, that spot is set as the waypoint reference point (step 6), and nodes, links and lanes to be passed in the road map information extracted to date are selected and determined based on the planned driving route (step 7). Then, waypoints are sequentially specified at positions along centers of the selected lanes (step 8), the arrangement of the waypoints is configured as the waypoint map (step 9—Fwp is set equal to 1 at this moment), and the waypoint map is delivered to the driving support device or the driving control device (step 10) and utilized.

Thus, when the driving of the vehicle with reference to the waypoint map is started, there is established a relationship: Fwp=1 (step 1), so it is determined whether or not a flag Fsp indicating whether or not the position of the vehicle has been accurately determined based on a position of a landmark on a road is equal to 1 (step 11). If Fsp≠1 in this step, it is determined whether or not a landmark has been detected (step 12). If a landmark has been detected, the vehicle driving course distance is corrected, and the position of the vehicle on the currently configured waypoint map is modified as described above (Fsp is set equal to 1 at this moment). Incidentally, if no landmark is detected, the vehicle driving course distance is not corrected. In general, however, there are landmarks such as stop line marks, stop lines, crosswalks and the like before the vehicle reaches and passes the first crossing. It should therefore be understood that the vehicle driving course distance is corrected relatively early.

After that, until the distance covered by the vehicle (the vehicle driving distance) exceeds a predetermined distance (step 14), road map information is additionally extracted sequentially and repeatedly as the predetermined range around the position of the vehicle changes in accordance with the movement of the position of the vehicle (step 16), and nodes, links and lanes to be passed are additionally selected and determined (step 17). Then, waypoints are additionally specified at positions along centers of the selected lanes (step 18), the waypoint map is additionally configured (step 19), and the waypoint map is delivered to the driving support device or the driving control device (step 10).

When the vehicle passes a crossing after the vehicle driving distance exceeds a predetermined distance through the continuation of the driving of the vehicle (step 14), the waypoint reference point may preferably be updated, and the waypoint driving course distance may preferably be reset at that moment, as described above (step 15). Even in the case where this waypoint reference point is updated, the relative positional relationship among the nodes on the planned driving route located ahead does not change. It should therefore be understood that only the waypoint coordinates and the value of the waypoint driving course distance are updated, and that there is no need to rearrange the very positions of the waypoints. Besides, as shown in the drawing, the process from additional extraction of road map information to additional constructor of the waypoint map may be repeatedly performed even after the waypoint reference point is updated.

Incidentally, although not shown in the drawing, in the case where the vehicle driving course distance from a crossing located behind in the traveling direction of the vehicle can already be specified, for example, in the case where the vehicle driving course distance at the time of the end of the last driving is stored, or in the case where a landmark is detected before the start of the driving of the vehicle and the vehicle driving course distance from the crossing located behind in the traveling direction of the vehicle can be calculated, etc., at a stage where no waypoint map has been configured (the case where Fwp≠1—step 1) in the above-mentioned processing operation, the position of the vehicle may be specified by the vehicle driving course distance without recourse to GPS information, and the waypoint map may be configured. Besides, the vehicle driving course distance may be corrected every time a landmark is detected during the driving of the vehicle.

G. Update Process of Road Map Information in Map Information Provision System (a) Outline of Update Process of Road Map Information Generally speaking, the waypoint map in the map information provision system according to the present embodiment is configured by joining a plurality of nodes whose relative positional relationship is expressed as a driving course distance in each lane, along the planned driving route. Then, as described already, the driving course distance in each lane (the inter-crossing driving course distance) representing the relative positional relationship among the nodes can be more accurately updated according to the information obtained at the time of the actual driving of the vehicle in the lane. Besides, the route along which the lane actually extends, the position of each landmark (the landmark driving course distance), the change in angle and curvature of each curve constituting point and the like can also be more accurately updated according to the information obtained at the time of the actual driving of the vehicle in the lane. Thus, the map information provision system according to the present embodiment may be configured such that the road map information accumulated in the road map information database is more accurately updated through the use of driving logs recorded along with the actual driving of the vehicle on roads (the deepening of road map information).

In the deepening of road map information in the map information provision system according to the present embodiment, broadly speaking, respective processes of recording a driving log during the driving of the vehicle, generating a driving trajectory from the driving log, and updating road map information from the driving trajectory are performed. The respective processes for the deepening of road map information will be described hereinafter.

(b) Recording of Driving Log During Driving of Vehicle

Figure 6A:
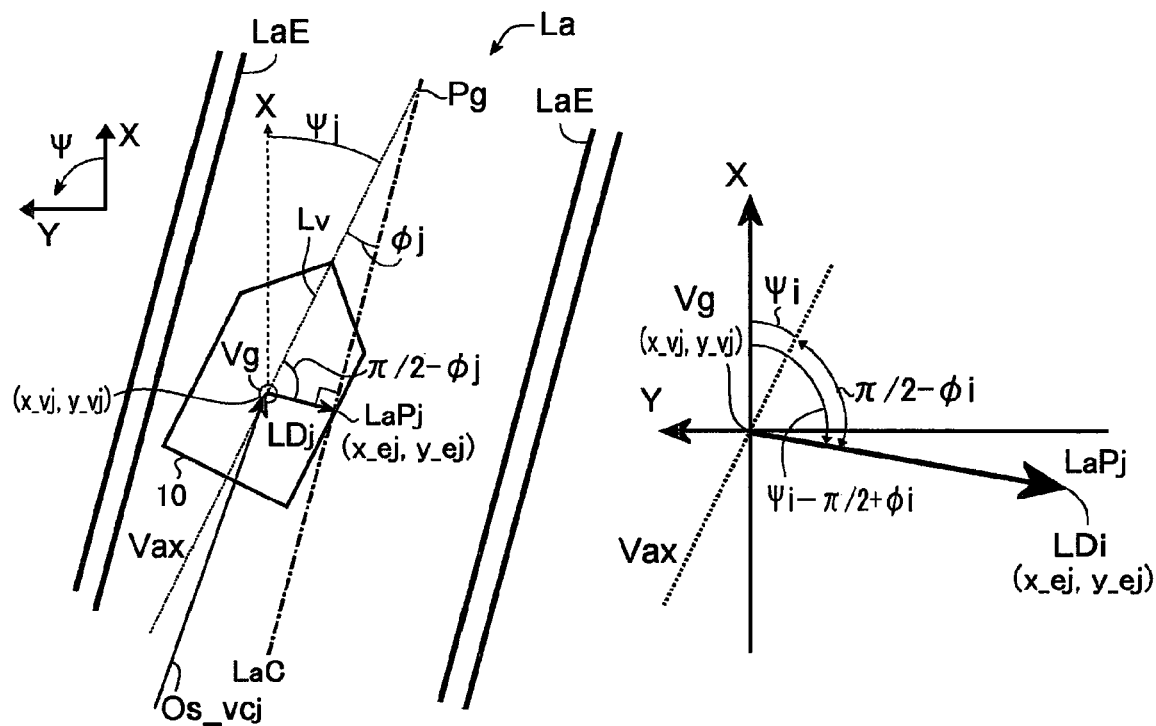
FIG. 6A is a schematic view of the vehicle for illustrating the definition of parameters of a driving log that is recorded in the driving vehicle, in the map information provision system according to the embodiment of the invention.
Figure 6B:
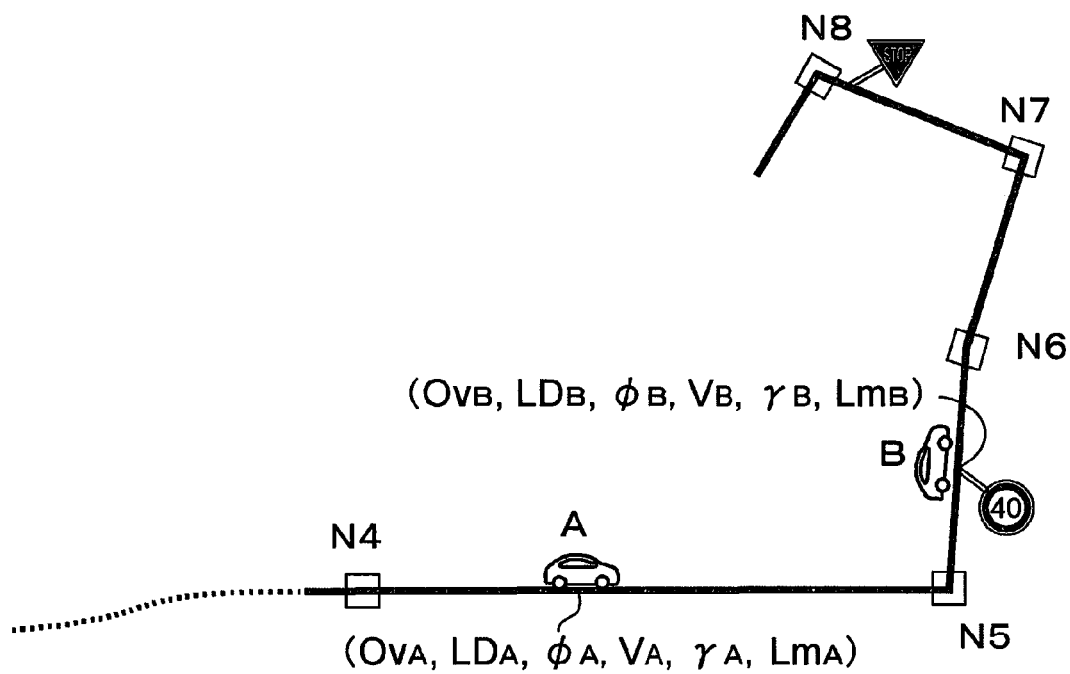
FIG. 6B is a view schematically representing how a driving log is recorded during the driving of a certain vehicle.

In the system according to the present embodiment, as schematically depicted in FIG. 6A, the following parameters may be recorded as the driving log at recording points located at predetermined time intervals or predetermined driving distance intervals, by "the driving log recording unit", during the driving of the vehicle (Os_vcj, LDj, φj, Vj, γj, Lmj) (j denotes an identification symbol of each of the recording points). The above-mentioned respective parameters are values that are defined as follows. Os_vcj denotes an actual vehicle driving course distance that is defined as an actual driving distance from an arbitrarily set reference point (a driving trajectory reference point), for example, a spot where the vehicle starts driving. In the case where the vehicle drives according to driving support or driving control through the use of the waypoint map, the driving trajectory reference point may be the same as the waypoint reference point. The actual vehicle driving course distance may be determined based on wheel speed values measured by the wheel speed sensors. In concrete terms, the actual vehicle driving course distance is given as, for example, vehicle speed×time or cumulative number of revolutions× 2π×wheel radius. LDj denotes a lateral deviation that is defined as a distance from a central position Vg of the vehicle to a centerline LaC of a lane La in which the vehicle is driving. The extension position of the centerline LaC of the lane is determined based on extension positions of both ends LaE of the lane detected in an image of the lane La photographed by the in-vehicle camera through the use of an arbitrary lane recognition algorithm. The lateral deviation LDj as the distance from the central position Vg of the vehicle to the centerline LaC of the lane is geometrically determined from the position of the centerline LaC in the image of the lane (e.g., LDj is calculated as Lv·sin φj through the use of a distance Lv between the central position Vg of the vehicle and an intersecting point Pg of the centerline LaC of the lane and a longitudinal axis Vax of the vehicle and a vehicle-lane deviation angle φj that will be mentioned below). φj denotes a vehicle-lane deviation angle that is defined as an angle that is formed by the longitudinal axis Vax of the vehicle with respect to the extension direction of the centerline LaC of the lane. The vehicle-lane deviation angle is measured from the extension direction of the centerline LaC in the image of the lane La and the direction of the longitudinal axis of the vehicle, through the use of the arbitrary lane recognition algorithm. Vj denotes a vehicle speed that may be determined based on the wheel speed values measured by the wheel speed sensors. γj may denote a yaw rate measured by a yaw rate/gyro sensor or a yaw rate sensor. Lmj denotes landmark/curve constituting point identification information that is defined as identification information on each landmark or curve constituting point detected in association with the actual vehicle driving course distance at the time when the landmark or curve constituting point is detected. The landmark may be detected by the in-vehicle camera or the radar device, as mentioned already. The curve constituting point may be recorded at a time point when the vehicle passes a position where the curve constituting point that is specified based on the information accumulated in the road map information database exists (e.g., at a time point when the vehicle driving course distance reaches the curve constituting point driving course distance). In concrete terms, referring to, for example, FIG. 6B, when the vehicle is located at a spot A, an actual vehicle driving course distance $Os_A$ to the spot A and the above-mentioned series of parameters are recorded as the driving log. In this case, there is no landmark, so nothing is recorded as $Lm_A$. On the other hand, when the vehicle is located at a spot B, an actual vehicle driving course distance $Os_B$ to the spot B and the above-mentioned series of parameters at that time are recorded as the driving log. In this case, there is a speed limit sign as a landmark, so identification information on the landmark is recorded as $Lm_B$. Incidentally, as will be described later in detail, coordinates (x_vj, y_vj) of the central position Vg of the vehicle on the driving trajectory plane (the X-Y plane) on which the driving trajectory reference point serves as the origin as shown in FIG. 6A and a yaw angle ψj measured from the X-axis are calculated through the use of a vehicle speed Vj and a yaw rate γj, which have been sequentially recorded. Incidentally, as described already, "the driving trajectory plane" is a two-dimensional plane on which the driving trajectory reference point serves as the origin and the distance and the direction are expressed as the driving course distance and the direction in which the vehicle has driven, respectively, as is the case with "the driving course distance plane". For example, the position at the time when the vehicle starts driving may serve as the origin (the driving trajectory reference point), and the traveling direction at that time may be set as the X-axis. Then, coordinates (x_ej, y_ej) of a point LaPj on the centerline LaC of the lane on the driving trajectory plane can be calculated through the use of coordinates (x_vj, y_vj) of the position Vg of the vehicle, the yaw angle ψj, the vehicle-lane deviation angle φj and the lateral deviation LDj.

Furthermore, the above-mentioned driving log is recorded together with, for example, the identification information on the nodes and lanes during the driving of the vehicle, in association with the nodes and lanes during the driving of the vehicle such that the nodes and lanes with the recorded driving log at the respective recording points can be identified, to update road map information that will be described later (the driving log may be stored in an arbitrary data recording device that pertains to the computer 50). As mentioned already, the nodes and lanes during the driving of the vehicle may be identified by determining a time-dependent position of the vehicle on road map information accumulated in the road map information database based on, for example, information from the GPS device or a positional relationship between the landmark detected during driving and the vehicle, and specifying the nodes and lanes in which the vehicle drives. For example, in entering or exiting a node to be passed by the vehicle, the node may be detected from a positional relationship between the vehicle and a landmark that is detected in or close to the node to be passed, and the detection thereof may be recorded in the driving log at that time point. Besides, especially in the case where the vehicle drives according to driving support or driving control through the use of the above-mentioned waypoint map, the vehicle drives substantially along the waypoint map. Therefore, the lane in which the vehicle is driving may be identified by referring to identification information on the nodes, links and/or lanes on the waypoint map. Alternatively, for example, in the case where the driving trajectory reference point coincides with the waypoint reference point, it is also possible to substantially specify the nodes and lanes where the respective recording points of the driving log exist, by collating the actual vehicle driving course distance Os_vcj with the waypoint Owpj, determining waypoints closest to the respective recording points, and specifying the nodes and lanes to which the waypoints pertain.

(c) Generation of Driving Trajectory from Driving Log

In the case where the driving log during the driving of the vehicle is recorded when the driver himself or herself drives the vehicle, namely, when the driver himself or herself causes the vehicle to drive by holding the steering wheel while steering the vehicle instead of relying on complete automatic driving as described above, the recorded driving log is expected to be a driving log at the time when the vehicle drives substantially at the center of a lane (on the other hand, when the waypoint map is configured based only on car navigation map information in the case where the vehicle drives according to driving support or driving control through the use of the waypoint map, the waypoint map may not extend on the centerline of the actual lane, depending on the accuracy in configuring the waypoint map). In this case, as mentioned already, when the vehicle speed and yaw rate recorded in the driving log are used, the positions of the vehicle at the respective recording points on the driving trajectory plane on which the distance is expressed as the driving course distance are obtained. When those positions of the vehicle are moved by "the lateral deviation" recorded in the driving log, an extension route of the centerline of a true lane, namely, "the driving trajectory" is considered to de detectable with high accuracy. Thus, when the driving log in the case where the driver himself or herself drives the vehicle is recorded, the driving log of a region where the vehicle has driven in the same direction in an arbitrary lane between two arbitrary nodes (crossings) that are adjacent to each other is selected from the recorded driving log by "the driving trajectory generation unit", and the driving trajectory is generated through the use of the selected driving log.

Figure 7A:
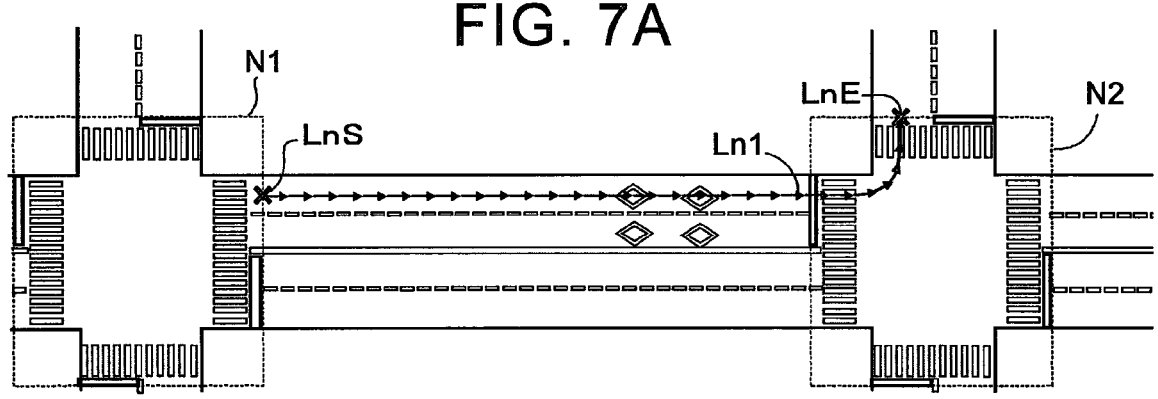
FIG. 7A is a view schematically representing a lane of a link between two adjacent crossings selected in generating a driving trajectory of the vehicle.

In generating the above-mentioned driving trajectory, first of all, "the arbitrary lane between the two arbitrary nodes that are adjacent to each other", which is to be updated later in road map information, may be appropriately selected by the user or an administrator of the system or a user of the vehicle. In concrete terms, as schematically depicted in FIG. 7A, as for the two adjacent nodes N1 and N2, a range from a position LnS of exit from the node N1 located behind (in the direction indicated by arrows) in the traveling direction of the vehicle to a position LnE of exit from the node N2 located in front in the traveling direction of the vehicle may be selected as the lane to be updated. The driving log corresponding to the selected lane may be extracted with reference to the identification information on the lanes recorded together with the driving log. Incidentally, the driving log obtained during the actual driving of the vehicle may include a log in the case where an irregular operation is performed due to a driving environment such as an avoidance maneuver for avoiding an obstacle, for example, a parked vehicle or the like and hence the lateral deviation has become abnormally large, or a log in the case where the lateral deviation, the vehicle speed and/or the yaw rate assume abnormal values as a result of abnormalities in the sensors. Such a driving log that includes the lateral deviation assuming an abnormal value should not be used to update road map information. Thus, in generating the driving trajectory from the driving log, any driving log that includes the lateral deviation assuming an abnormal value is preferably removed in advance from the driving logs for use. Each driving log that does not include any abnormal value in the lateral deviation as described above and that is not removed will be referred to hereinafter as "a normal driving log".

In one aspect of the actual process of generating the driving trajectory, first of all, when a normal driving log at the time when the vehicle drives in a certain lane between two adjacent nodes is obtained, positions of leading and terminal ends of the lane may be determined on the driving trajectory plane. The positions of the leading and terminal ends of the lane can be determined through the use of the road map information accumulated in the road map information database. As a result, the positions of the leading and terminal ends of the lane can be determined again with higher accuracy by referring to the normal driving log.

Figure 7B:
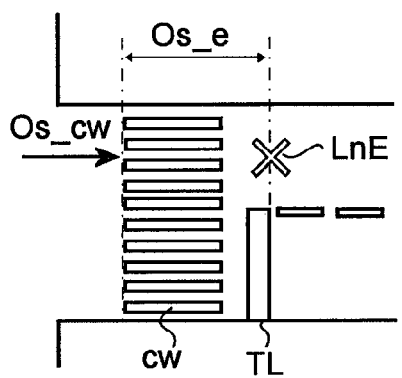
FIG. 7B is a view schematically representing a process of specifying a position of a terminal end of a lane in the case where there is a crosswalk in a crossing.
Figure 7C:
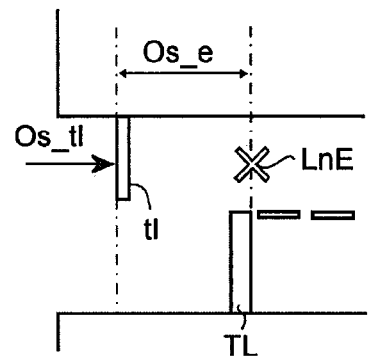
FIG. 7C is a view schematically representing a process of specifying a position of a terminal end of a lane in the case where there is a stop line in a crossing.
Figure 7D:
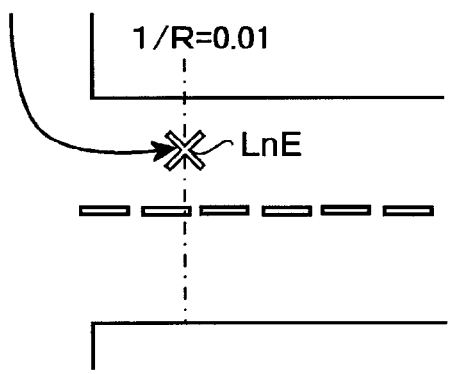
FIG. 7D is a view schematically representing a process of specifying a position of a terminal end of a lane in the case where the lane winds in a crossing where there is no landmark.
Figure 7E:
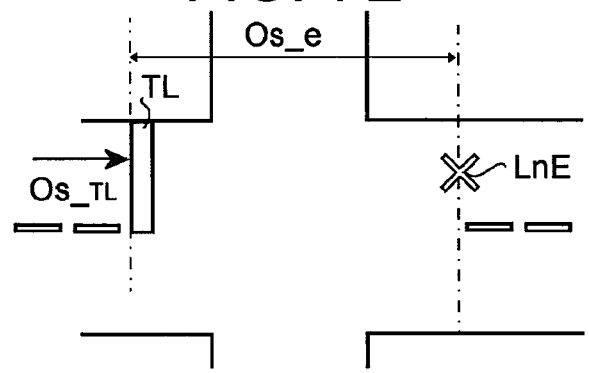
FIG. 7E is a view schematically representing a process of specifying a position of a terminal end of a lane in the case where the lane extends straight in a crossing where there is no landmark.

The terminal end of a certain lane may be determined in various aspects depending on the situation in a node where the terminal end exists. For example, as shown in FIG. 7B, in the case where there is a crosswalk cw immediately short of a terminal end LnE of the lane, the position of the terminal end LnE may be determined as a position (=Os_cw+Os_e) obtained by adding a distance Os_e from a rear end of the crosswalk cw in the traveling direction of the vehicle to the position of the terminal end LnE of the lane (an outer edge of the stop line TL), which has been calculated through the use of the road map information accumulated in the road map information database, to a driving course distance Os_cw from a leading end LnS of the lane to the rear end of the crosswalk cw in the traveling direction of the vehicle (which is recorded in the driving log). That is, in this case, the value obtained by adding the distance Os_e from the crosswalk cw to the terminal end LnE of the lane, which is based on the road map information in the road map information database, to the driving course distance Os_cw to the crosswalk cw, which is obtained from the driving log, is adopted as a relative driving course distance from the terminal end of the lane to the leading end LnS of the lane, instead of the value calculated through the use of the road map information accumulated in the road map information database. Besides, by the same token, as shown in FIG. 7C, when there is a stop line t1 immediately short of the terminal end LnE of the lane, the position of the terminal end LnE may be determined as a position (=Os_t1+Os_e) obtained by adding the distance Os_e from a rear end of the stop line t1 in the traveling direction of the vehicle to the position of the terminal end LnE of the lane (the outer edge of the stop line TL), which has been calculated through the use of the road map information accumulated in the road map information database, to a driving course distance Os_t1 from the leading end LnS of the lane to the rear end of the stop line t1 in the traveling direction of the vehicle (which is recorded in the driving log). Furthermore, as depicted in FIG. 7D, in the case where there is no stop line or crosswalk in the node where the terminal end LnE of the lane exists, if the lane ends after making a right or left turn in the node, a curvature $\rho(\gamma\gamma/V)$ may be calculated from the vehicle speed V and the yaw rate $\gamma$ in the driving log in the vicinity of the terminal end LnE of the lane (which is determined based on the road map information in the road map information database) along a driving route, and a spot where the curvature $\rho$ changes from a value equal to or larger than a predetermined value to a value equal to or smaller than the predetermined value may be specified as the position of the terminal end LnE of the lane. It should be noted herein that the predetermined value for the curvature $\rho$ may be, for example, 0.01 (1/m) (because the lane can be regarded as a substantially straight line when the curvature $\rho$ is smaller than 0.01 (1/m)). On the other hand, as depicted in FIG. 7E, in the case where there is no stop line or crosswalk in the node where the terminal end LnE of the lane exists and the lane ends after extending straight in the node, the position of the terminal end LnE may be determined as a position $Os_{TL}+Os\_e$) obtained by adding the distance Os_e from a landmark located immediately short of the terminal end LnE of the lane to the terminal end LnE of the lane, which is determined based on the road map information in the road map information database, to a driving course distance $Os\_{TL}$ from the leading end LnS of the lane to the landmark located immediately short of the terminal end LnE of the lane (e.g., the stop line TL on the entrance side of the node or the like) (which is determined based on the road map information in the road map information database). Thus, in any one of the above-mentioned aspects, the position of the terminal end LnE of the lane may be determined as a relative driving course distance from the leading end LnS of the lane.

On the other hand, as is also understood from FIG. 7A, the leading end LnS of the certain lane is the front end of the node located behind in the traveling direction of the vehicle in the lane, namely, the terminal end LnE of a lane preceding that lane. Thus, when a terminal end of a certain lane is determined, a leading end of a subsequent lane is automatically determined. In this respect, as a rule, in the case where the vehicle is caused to drive along a certain route, the driving route is not configured as a single lane alone between two certain nodes that are adjacent to each other, but as a plurality of lanes that are continuously linked with one another. Accordingly, the driving log obtained during certain driving of the vehicle is usually recorded over a plurality of continuous lanes. Thus, in generating a driving trajectory in a certain single lane between two certain nodes that are adjacent to each other, the position of the terminal end LnE of the lane determined as to a lane preceding the certain single lane may be adopted as the leading end LnS of the certain single lane.

Figure 7F:
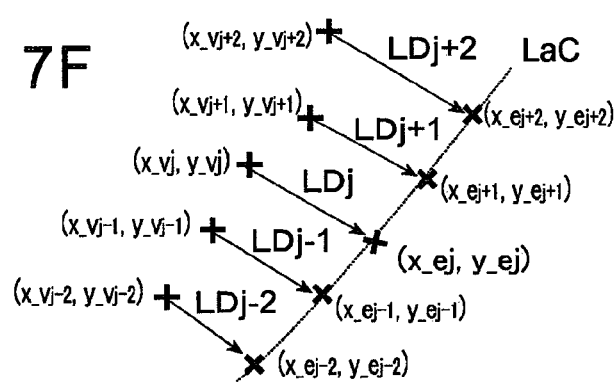
FIG. 7F is a view schematically representing a process of generating a lane center point through the use of a lateral deviation from an actual driving position of the vehicle.

As described above, when the leading and terminal ends LnS and LnE of the certain lane are determined on the driving trajectory plane, coordinates (x_vj, y_vj) of the central position Vg of the vehicle at each of the recording points of the driving log on the driving log plane and the yaw angle $\psi j$ measured from the X-axis of the driving trajectory plane (e.g., the traveling direction at the time when the vehicle starts driving) as schematically depicted in FIG. 6A are first sequentially determined through the use of the vehicle speed Vj and the yaw rate γj, among the parameters of the driving log between this leading end LnS and this terminal end LnE in the normal driving log. In concrete terms, for example, the yaw angle $\psi j$ may be sequentially determined as $\psi_j = \psi_{j-1} + \gamma_{j-1} \cdot \Delta t$ ($\psi_0 = 0$) (it should be noted herein that $\Delta t$ denotes a time interval among the recording points). Then, the central position Vg of the vehicle (x_vj, y_vj) may be sequentially determined as $x\_v_j = x\_v_{j-1} + V_{j-1} \cdot \Delta t \cdot \cos \psi_{j-1}$ (x_v$_0$=0) and $y\_v_j = y\_v_{j-1} + V_{j-1} \cdot \Delta t \cdot \sin \psi_{j-1}$ (y_v$_0$=0). Then, the central position Vg of the vehicle at each of the recording points may be moved by the lateral deviation LDj, and coordinates (x_ej, y_ej) of the point LaPj on the centerline LaC of the lane may be determined as schematically depicted in FIG. 7F, through the use of the lateral deviation LDj and the vehicle-lane deviation angle $\phi j$ among the parameters of the driving log. In concrete terms, the relationship between the central position Vg (x_vj, y_vj) of the vehicle and the point LaPj(x_ej, y_ej) of the centerline of the lane is given as follows with reference to the right side of FIG. 6B: $x\_e_j = x\_v_j + LD_j \cdot \cos(\psi_j - \pi/2 + \phi_j)$ and $y\_e_j = y\_v_j + LD_j \cdot \sin(\psi_j - \pi/2 + \phi_j)$. In the system according to the present embodiment, the arrangement of the above-mentioned points LaPj of the centerline of the lane is used as "the driving trajectory" obtained through the actual driving of the vehicle in the lane. These points LaPj of the centerline of the lane are considered to be arranged on the centerline of the lane actually passed by the vehicle. Therefore, the distance that is calculated along the lane centerline points (an actual inter-crossing driving course distance) is expected to be a more accurate driving course distance in a lane between two adjacent nodes, namely, an inter-crossing driving course distance. Incidentally, the actual inter-crossing driving course distance may be calculated by integrating distances among the lane centerline points between the leading and terminal ends LnS and LnE of the lane.

(d) Update of Road Map Information

When the number of driving trajectories generated as to a certain lane as described above reaches a predetermined number, the road map information accumulated in the road map information database as to the lane may be updated, through the use of the driving trajectories. Incidentally, as is understood by those skilled in the art, the accuracy of road map information after the update is enhanced as the number of driving trajectories used for the update increases. As a result, the above-mentioned "predetermined number" is a number that allows the update of map information with sufficient accuracy to be achieved when the number of driving trajectories reaches "the predetermined number". As a condition on this predetermined number, when the accuracy of less than 1 m per 100 m is required, n satisfying an empirically obtained condition expression: $1/(2^{1/2} \times n) \leq 0.1$ m is selected. In this case, n=8 (a Fix condition). Some aspects of the process of updating road map information performed in the present embodiment will be described hereinafter.

Figure 8:
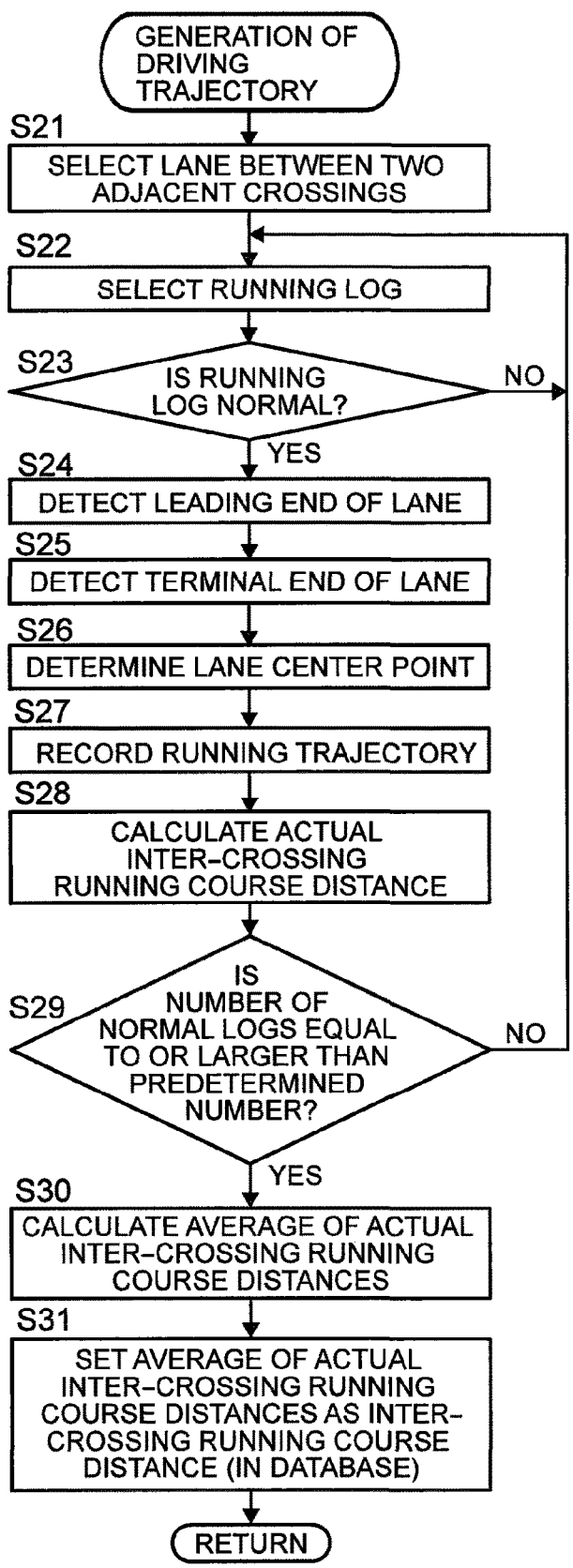
FIG. 8 is a view representing a process of generating a driving trajectory of the vehicle from the driving log recorded in the driving vehicle and a process of updating an inter-crossing driving course distance accumulated in a road map information database based on the driving trajectory, in the map information provision system according to the embodiment of the invention, in the form of a flowchart.

(i) In one of the aspects of the process of updating the updated road map information as to the inter-crossing driving course distance, the value of the inter-crossing driving course distance in the corresponding lane that is accumulated in the road map information database may be updated through the use of the above-mentioned actual inter-crossing driving course distance in a certain lane between two certain nodes that are adjacent to each other. FIG. 8 shows an example of the process from generation of the driving trajectory to the update of the inter-crossing driving course distance in the form of a flowchart. This process may be performed at an appropriate timing under the command of the user or administrator of the system or the user of the vehicle, after the vehicle drives in the same direction along a certain driving route a plurality of times. Incidentally, in the process shown in the drawing, steps 21 to 29 are carried out by the driving trajectory generation unit, and steps 30 and 31 are carried out by the road map information correction unit. In concrete terms, referring to the drawing, first of all, a lane to be updated between two adjacent nodes is selected (step 21), a driving log of the selected lane is selected (step 22), and it is then inspected and determined whether or not the selected driving log is "a normal driving log" as described previously (step 23). If it is determined that the selected driving log is not "a normal driving log", namely, that the lateral deviation or the like includes an abnormal value, a new driving log of the selected lane is selected and inspected. On the other hand, if it is determined that the selected driving log is a normal driving log, a leading end of the lane is detected (step 24—detection of a terminal end of a preceding lane), a terminal end of the lane is detected (step 25), and a lane center point is determined (step 26) as described previously. Then, a driving trajectory obtained from the lane center point is recorded in the data recording device (step 27), and an actual inter-crossing driving course distance is calculated along the driving trajectory (step 28).

Thus, the above-mentioned process from selection of the driving log to calculation of the actual inter-crossing driving course distance is repeatedly performed until the number of selected normal driving logs or the number of recorded driving trajectories reaches the foregoing predetermined number, namely, until the Fix condition is satisfied (step 29). Then, when the Fix condition in step 29 is satisfied, an average of actual inter-crossing driving course distances that are identical in number to the recorded driving trajectories is calculated (step 30), and the value of the corresponding inter-crossing driving course distance that is accumulated in the road map information database is updated to the value of the average (step 31). According to this constructor, the inter-crossing driving course distance in the lane to be updated is updated to the average of driving course distances that satisfy the Fix condition and that have been calculated along the actual driving trajectory of the vehicle that is assumed to have driven along the center of the lane. Therefore, the accuracy of the inter-crossing driving course distance is expected to be higher than what is obtained based only on car navigation map information.

(ii) In another aspect of the process of updating the updated road map information on a terminal end waypoint map, as for a certain lane between two certain nodes that are adjacent to each other, a waypoint map (the terminal end waypoint map) in the vicinity of a terminal end in the case where the lane ends after making a right or left turn may be updated through the use of the parameters recorded as a normal driving log. The terminal end waypoint map in the case where this lane ends after making a right or left turn, namely, the driving course in the node (see the description of the modeling of the crossings) is primarily set on the assumption that the vehicle drives after making a turn from a spot appropriately set in the node (a turn starting point) with a radius of curvature and an angle that are calculated based on the road linearity in car navigation map information. In this aspect according to the present embodiment, this terminal end waypoint map is more accurately updated based on the parameters recorded in the normal driving logs whose number has reached the predetermined number. Incidentally, the terminal end waypoint map in the case where the lane ends after making a right or left turn provides guidance on the driving route at the time when the vehicle makes a right or left turn at a crossing. It should therefore be understood that the map information on the terminal end waypoint map is preferably available with especially high accuracy in driving support and driving control.

Figure 9A:
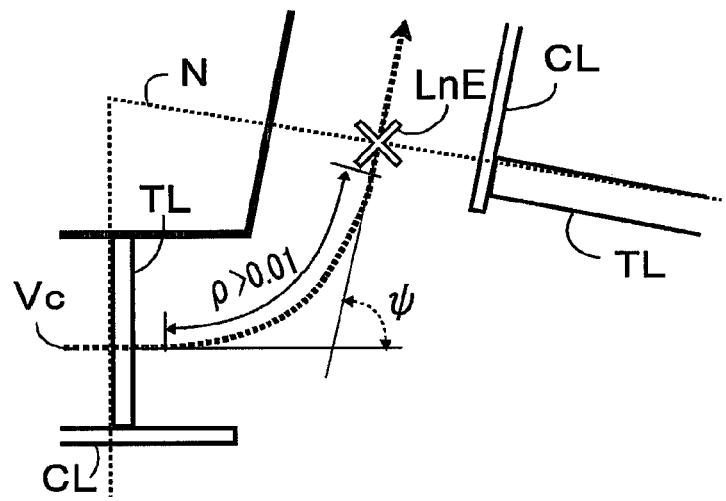
FIG. 9A is a view schematically representing a process of determining an angle of a curved trajectory in a terminal end-side one of two selected crossings that are adjacent to each other on a driving trajectory of the vehicle in a lane of a link between the crossings.
Figure 9B:
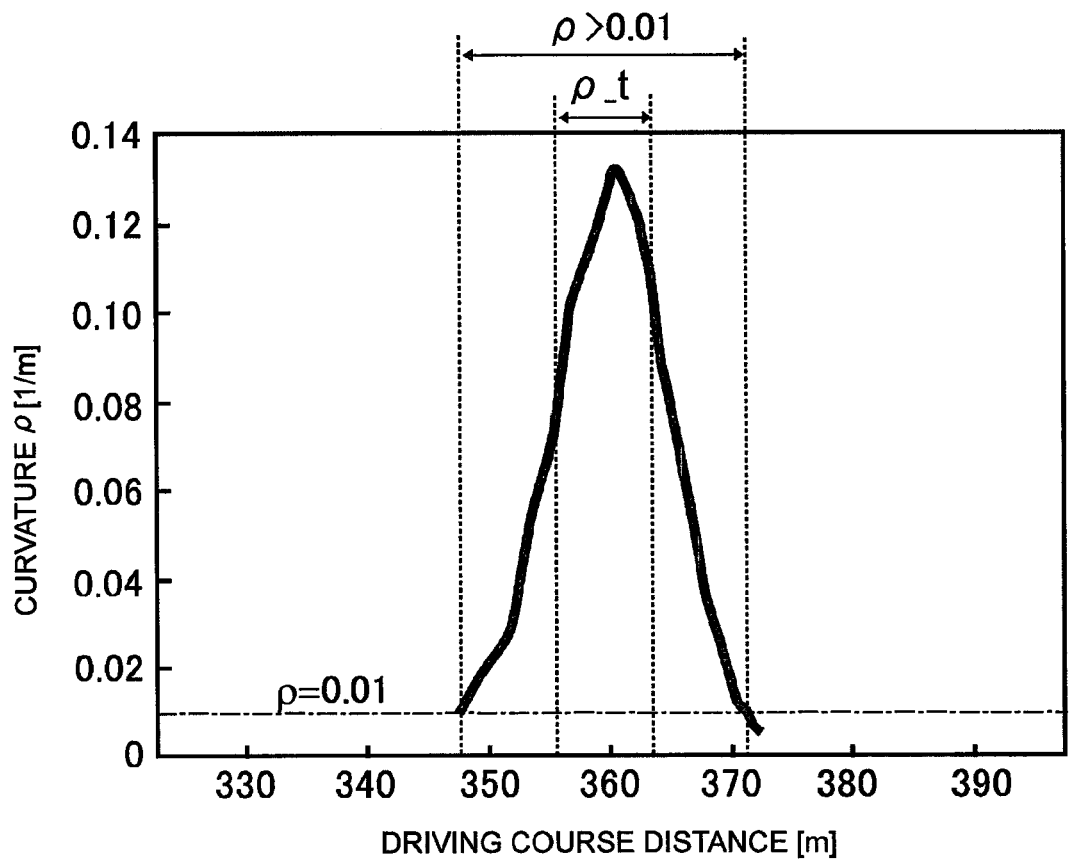
FIG. 9B is a view schematically representing a process of determining a curvature radius of the curved trajectory of FIG. 9A.

The above-mentioned process of updating the terminal end waypoint map is performed at a stage where normal driving logs whose number has reached the predetermined number are collected or at a stage where the number of recorded driving trajectories reaches the predetermined number (i.e., at a stage where the Fix condition is satisfied). In the concrete process of updating the terminal end waypoint map, first of all, as schematically depicted in FIG. 9A, the curvature $\rho$ is calculated through the use of the vehicle speed V and the yaw rate $\gamma$, which have been measured along the driving trajectory (or the arrangement of waypoints) in the vicinity of the terminal end of the lane or in the node on the terminal end side in each of the normal driving logs (whose number has reached the predetermined number). A range where the curvature $\rho$ is equal to or larger than a predetermined value, for example, a range where $\rho>0.01$ (1/m) is determined. Then, an angle that is formed by this range, namely, an angle $\psi$ (a terminal end angle) that is formed by the traveling direction of the vehicle at a spot located behind in the traveling direction of the vehicle where $\rho=0.01$ and the traveling direction of the vehicle at a spot located in front in the traveling direction of the vehicle where $\rho=0.01$ is determined. Then, an average way of all the angles in the normal driving logs is regarded as the terminal end angle at the terminal end. Subsequently, as schematically depicted in FIG. 9B, in each of the normal driving logs (whose number has reached the predetermined number), the range where the curvature $\rho$ is equal to or larger than the predetermined value, for example, the range where $\rho>0.01$ (1/m) is trisected in the direction of the driving course distance, an inverse (1/$\rho$) of the curvature $\rho$ in a central section $\rho\_t$ thereof is calculated, and an average of such inverses is calculated as a curvature radius R. It should be noted herein that only the curvature of the central section $\rho\_t$ obtained through trisection is adopted in consideration of the fact that there is a transition section at the beginning and end of a turn of the vehicle. Then, an average Rav of all the curvature radii R calculated as to the respective normal driving logs is regarded as a terminal end curvature radius at the terminal end.

Figure 10A:
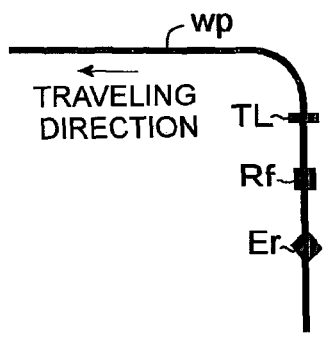
FIG. 10A is a view schematically representing a process of determining a starting point of a curve on the curved trajectory of FIG. 9A.
Figure 10B:
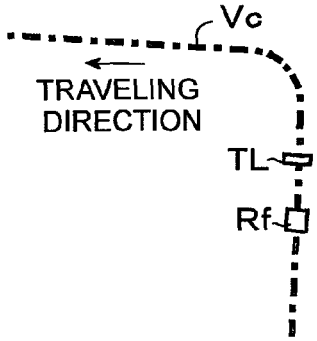
FIG. 10B is a view schematically representing the process of determining the starting point of the curve on the curved trajectory of FIG. 9A.

Thus, when the terminal end angle and the terminal end curvature radius at the terminal end of the lane are determined, the position of the turn starting point at the terminal end of the lane may be determined according to the following procedure. First of all, referring to FIG. 10A, a terminal end waypoint map wp reconfigured by modifying the terminal end angle and the curvature radius into the terminal end angle $\psi$av and the terminal end curvature radius Ray, which have been calculated based on the foregoing driving log respectively, is prepared from the terminal end waypoint map generated based on car navigation map information as described previously. Then, a spot located short of the position of the stop line TL by 10 m in the terminal end waypoint map wp thus reconfigured is specified as a reference point Rf, and a spot located further short thereof by 10 m is specified as a rotation evaluation point Er. On the other hand, as depicted in FIG. 10B, on each of the driving trajectories Vc obtained from the normal driving logs, the stop line TL detected short of a turning spot in the vicinity of the terminal end of the lane is specified, and a spot located further short thereof by 10 m is specified as the reference point Rf (only one of the driving trajectories Vc is shown in the drawing for the sake of simplicity, and the same will hold true hereinafter).

Figure 10C:
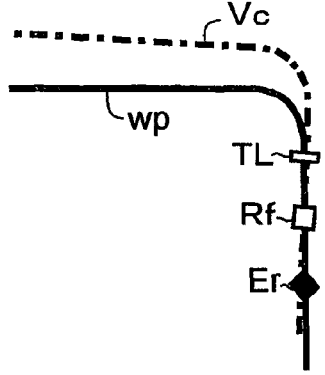
FIG. 10C is a view schematically representing the process of determining the starting point of the curve on the curved trajectory of FIG. 9A.
Figure 10D:
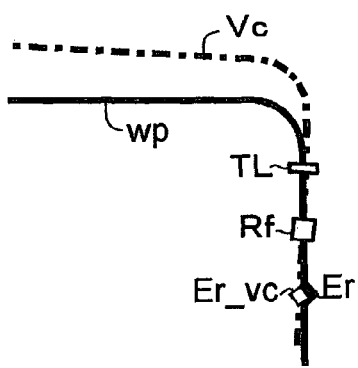
FIG. 10D is a view schematically representing the process of determining the starting point of the curve on the curved trajectory of FIG. 9A.
Figure 10E:
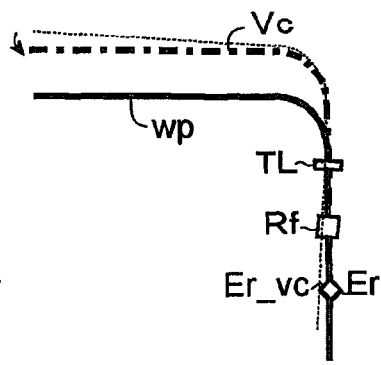
FIG. 10E is a view schematically representing the process of determining the starting point of the curve on the curved trajectory of FIG. 9A.
Figure 10F:
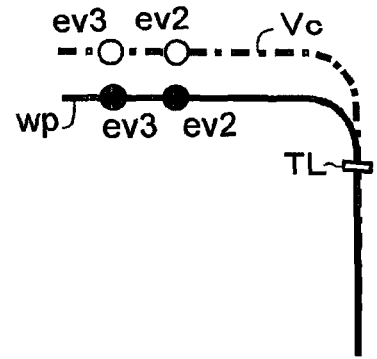
FIG. 10F is a view schematically representing the process of determining the starting point of the curve on the curved trajectory of FIG. 9A.

Subsequently, as depicted in FIG. 10C, the reconfigured terminal end waypoint map wp and each of the driving trajectories Vc are superimposed on each other such that their respective reference points Rf coincide with each other. Furthermore, as depicted in FIG. 10D, on each of the driving trajectories Vc, a spot located short of the reference point Rf by 10 m is specified as a rotation evaluation point Er_vc. Then, as shown in FIG. 10E, each of the driving trajectories Vc is rotated around the reference point Rf such that the rotation evaluation point Er_vc of each of the driving trajectories Vc becomes as close as possible to the rotation evaluation point Er of the reconfigured terminal end waypoint map wp. Then, as shown in FIG. 10F, the route of entrance into the position of the stop line before a turn on each of the driving trajectories Vc and the route of entrance into the position of the stop line before a turn on the reconfigured terminal end waypoint map wp are expected to coincide with each other. However, on a route located beyond the position of the stop line before a turn, the turn starting points (the spots where the curvature changes from a value equal to or smaller than the predetermined value to a value equal to or larger than the predetermined value) may be different from each other. Therefore, each of the driving trajectories Vc and the reconfigured terminal end waypoint map wp do not necessarily coincide with each other. Accordingly, in the following process, the turn starting point on the reconfigured terminal end waypoint map wp is adjusted to approach the turn starting point on each of the driving trajectories Vc.

Figure 10G:
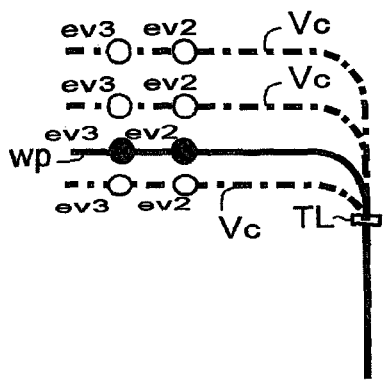
FIG. 10G is a view schematically representing the process of determining the starting point of the curve on the curved trajectory of FIG. 9A.
Figure 10H:
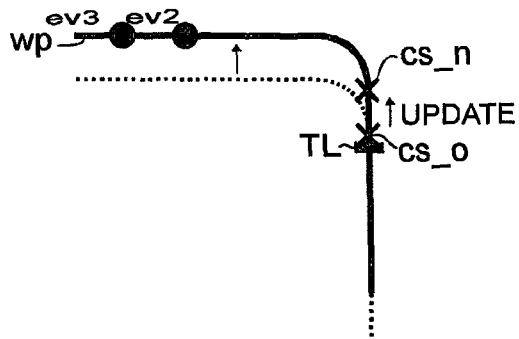
FIG. 10H is a view schematically representing the process of determining the starting point of the curve on the curved trajectory of FIG. 9A.

Thus, in the state of FIG. 10F, evaluation points ev2 and ev3 are specified as spots located beyond a turn ending point on the reconfigured terminal end waypoint map wp (a spot where the curvature changes from a value equal to or larger than the predetermined value to a value equal to or smaller than the predetermined value) by 20 m and 30 m respectively. By the same token, on each of the driving trajectories Vc as well, the evaluation points ev2 and ev3 are specified as spots located beyond the turn ending spot by 20 m and 30 m respectively. Then, the turn starting points on the plurality of the driving trajectories Vc do not necessarily coincide with one another. In fact, therefore, as schematically depicted in FIG. 10G, for the reconfigured terminal end waypoint map wp, the plurality of the driving trajectories Vc extend in a scattered manner substantially perpendicularly to the traveling direction of the vehicle after a turn, and the evaluation points ev2 and ev3 are specified as spots located beyond the turn ending point by 20 m and 30 m respectively. It should be noted herein that each of the driving trajectories Vc is a route obtained through the actual driving of the vehicle. Therefore, the position where the sum of squares of deviations from routes on the respective driving trajectories Vc is minimized can be considered to be a most plausible route at the terminal end (according to the method of least squares). Thus, a route beyond a turn starting point cs_0 on the reconfigured terminal end waypoint map wp is translated onto a route on which the turn starting point is a spot cs_n, so as to make the evaluation points ev2 and ev3 on the terminal end waypoint map wp coincident with positions giving the evaluation points ev2 and ev3 at which the sum of squares of deviations from the evaluation points ev2 and ev3 on all the driving trajectories Vc is minimized, respectively. Thus, the waypoint map along the obtained route is determined as a more accurate terminal end waypoint map. Then, the terminal end waypoint map thus obtained may be updated as the road map information that is accumulated in the road map information database. Incidentally, the series of processes of updating the terminal end waypoint map may be performed by the road map information correction unit.

(iii) In another aspect of the process of updating the updated road map information on the landmark driving course distance, the landmark driving course distance that specifies the position of each landmark may be updated through the use of the normal driving log or the driving trajectory. As mentioned already, in the map information provision system according to the present embodiment, the landmark driving course distance is utilized to accurately determine the position of the vehicle. It should therefore be understood that the landmark driving course distance is preferably available with especially high accuracy in driving support and driving control.

The landmark driving course distance is primarily calculated from positional information on each landmark and positional information on a closest crossing located behind in the traveling direction of the vehicle in car navigation map information. In contrast, with the system according to the present embodiment, as described already, in the case where landmark identification information detected in association with the actual vehicle driving course distance at the time when a landmark is detected is recorded in the driving log, the landmark driving course distance corresponding to the recorded landmark can be calculated by subtracting the driving course distance from the landmark to the position of exit from the closest crossing located behind in the traveling direction of the vehicle from the actual vehicle driving course distance at the time when the landmark is detected. Then, the landmark driving course distance obtained through the use of this driving log is based on the parameters at the time when the vehicle actually passes the position where the landmark exists. Therefore, the landmark driving course distance is expected to be more accurate than a value obtained from car navigation map information.

Figure 11:
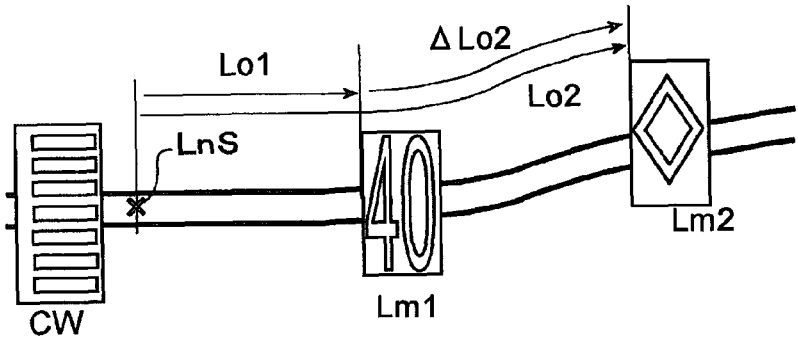
FIG. 11 is a view schematically representing a process of updating a landmark driving course distance accumulated in the road map information database in the case where a landmark is detected on the driving trajectory of the vehicle in the lane of the link between the two selected crossings that are adjacent to each other.

The process of updating the landmark driving course distance is also performed at the stage where normal driving logs whose number has reached the predetermined number are collected or at the stage where the number of driving trajectories reaches the predetermined number (i.e., at the stage where the Fix condition is satisfied). In the process of updating the landmark driving course distance, in concrete terms, as schematically depicted in FIG. 11, a landmark driving course distance Lo1 is first calculated by subtracting the driving course distance from the landmark to the position LnS of exit from the closest crossing located behind in the traveling direction of the vehicle from the actual vehicle driving course distance at the time when the landmark Lm1 is detected, as described above, as to the commonly detected landmark Lm1 in each of the normal driving logs. Then, the average of the landmark driving course distances Lo1 in all the normal driving logs may be updated as a landmark driving course distance that is newly accumulated in the road map information database.

Besides, as depicted in FIG. 11 as well, in the case where there are two or more landmarks Lm2 on a link between two adjacent nodes, a landmark driving course distance Lo2 to each of the second and following landmarks Lm2 along the traveling direction of the vehicle may be given by first measuring a distance ΔLo2 to an immediately preceding landmark and adding the distance ΔLo2 to the immediately preceding landmark to the landmark driving course distance Lo1 to the immediately preceding landmark (i.e., may be given according to an equation: Lo2=Lo1+ΔLo2). This is because of the following reason. While the position LnS of exit from the crossing located behind in the traveling direction of the vehicle and closest to the landmark may be determined through the use of car navigation map information, each of the relative distances among two or more landmarks that exist on a single link can be accurately measured by being detected in the vehicle respectively. In the road map information database, therefore, the relative distances among the landmarks can be accurately recorded.

(iv) In still another aspect of the process of updating the updated road map information as information at the curve constituting points, information on the change in angle and curvature radius at each of the curve constituting points may be updated through the use of the normal driving log or the driving trajectory. In the map information provision system according to the present embodiment, information on the change in angle and curvature radius at each of the curve constituting points is utilized to arrange the waypoints in the lane. It should therefore be understood that this information is preferably available with especially high accuracy in driving support and driving control.

Information at each of the curve constituting points in car navigation map information is primarily used as the information on the change in angle and curvature radius at each of the curve constituting points. In contrast, with the system according to the present embodiment, as described already, in the case where identification information on a certain curve constituting point is recorded in the driving log when the vehicle passes the curve constituting point, for example, at the time point when the vehicle driving course distance obtained by subtracting the actual vehicle driving course distance to the closest node located behind in the traveling direction of the vehicle from the actual vehicle driving course distance at the position of the vehicle or the vehicle driving course distance determined based on the positional relationship among the landmarks detected during the driving of the vehicle reaches the curve constituting point driving course distance, the change in angle and curvature radius at each of the curve constituting points can be calculated from the vehicle speed and yaw rate in the vicinity thereof. Then, the information on each of the curve constituting points obtained through the use of this driving log is based on the parameters at the time when the vehicle actually passes the position of each of the curve constituting points. Therefore, this information is expected to be more accurate than a value obtained from car navigation map information.

Figure 12A:
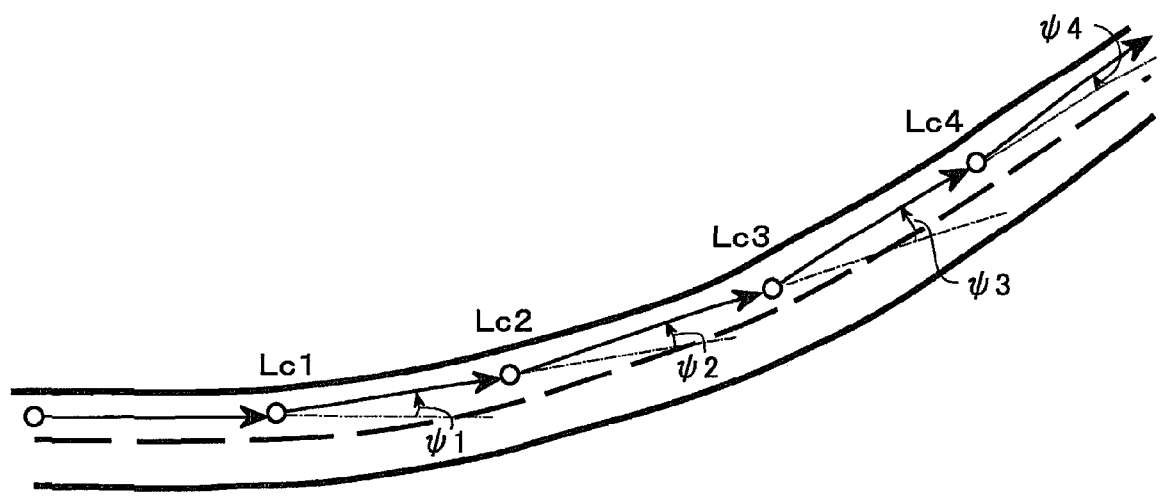
FIG. 12A is a view schematically representing a process of updating information on curve constituting points (angles) accumulated in the road map information database in the case where there are curve constituting points Lc on the driving trajectory of the vehicle in the lane of the link between the two selected crossings that are adjacent to each other.

The process of updating the information on the curve constituting points is also performed at the stage where normal driving logs whose number has reached the predetermined number are collected or at the stage where the number of recorded driving trajectories reaches the predetermined number (i.e., at the stage where the Fix condition is satisfied). In the concrete process of updating the information on the curve constituting points, first of all, as described previously, at the time point when, for example, the vehicle driving course distance reaches the curve constituting point driving course distance at each of the curve constituting points, identification information on each of the curve constituting points is recorded in the driving log. Thus, the passing of the vehicle past the spot corresponding to each of the curve constituting points is recorded. Therefore, as schematically depicted in FIG. 12A, the respective spots thus recorded are identified and specified as curve constituting points (Lc1, Lc2, . . . ). Then, each of the changes in angle $\psi 1$, $\psi 2$ . . . at each of the curve constituting points Lc1, Lc2 . . . is a quantity that is expressed as the direction and magnitude of the change in the angle of rotation of a line joining each of the curve constituting points to the immediately preceding curve constituting point toward a line joining each of the curve constituting points to the subsequent curve constituting point, along the traveling direction of the vehicle. As a result, each of the changes in angle $\psi 1$, $\psi 2$ . . . at each of the curve constituting points Lc1, Lc2 . . . is equivalent to a change in yaw angle of the vehicle that is obtained through integration of the yaw rate $\gamma$ from each of the curve constituting points to the subsequent curve constituting point (i.e., $\Sigma(\gamma_j \cdot \Delta t_j)$, it should be noted herein that $\Delta t_j = (Os\_vc_{j+1} - Os\_vc_j)/V_j$). Thus, the yaw rate from each of the curve constituting points to the subsequent curve constituting point is integrated for each of the driving logs, and the change $\psi$ in angle at each of the curve constituting points is calculated. Furthermore, the average $\psi av$ of the changes in angle at the respective curve constituting points in all the normal driving logs whose number has reached the predetermined number is determined as the value of the change in angle at each of the curve constituting points. Thus, the change in angle at each of the curve constituting points may be updated to this value in the road map information database.

Figure 12B:
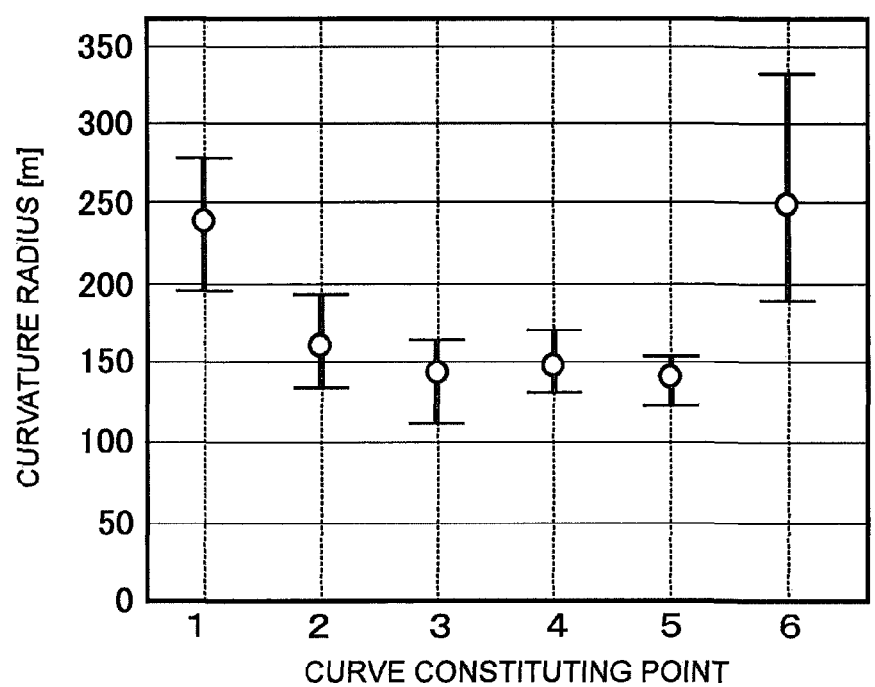
FIG. 12B shows an exemplary curvature radius calculated from a vehicle speed and a yaw rate at curve constituting points detected on the driving trajectory of the vehicle in the lane of the link between the two selected crossings that are adjacent to each other.

On the other hand, as for the curvature radius of each of the curve constituting points, the vehicle speed Vj and yaw rate $\gamma j$ recorded in the driving log are referred to within a predetermined distance range, for example, a range of 5 m in the longitudinal direction from the recorded spot along the traveling direction of the vehicle for each of the driving logs, as to each of the specified curve constituting points Lc1, Lc2 . . . , and the curvature radius Rj is calculated as Vj/$\gamma j$ along the predetermined distance range. Then, for each of the driving logs, an average of the curvature radii Rj within this predetermined distance range is calculated as the curvature radius Rav of each of the curve constituting points. Furthermore, an average Ravt of the curvature radii Rav in all the normal driving logs whose number has reached the predetermined number is determined as a value of the curvature radius at each of the curve constituting points. The curvature radius at each of the curve constituting points may be updated to this value in the road map information database. FIG. 12B shows an example of a curvature radius calculated, in a lane having six curve constituting points, for each of the curve constituting points according to the above-mentioned procedure. In the drawing, each blank circle represents the average Ravt of the curvature radii in all the normal driving logs, and each error bar represents a standard deviation. In the example of the drawing, it is observed that the curvature radius substantially smoothly changes assuming natural values from the entrance into a lane to the exit therefrom (increases again after gradually decreasing). It has thus been demonstrated that the curvature radius in each lane can be calculated according to the procedure of the present embodiment.

Figure 13:
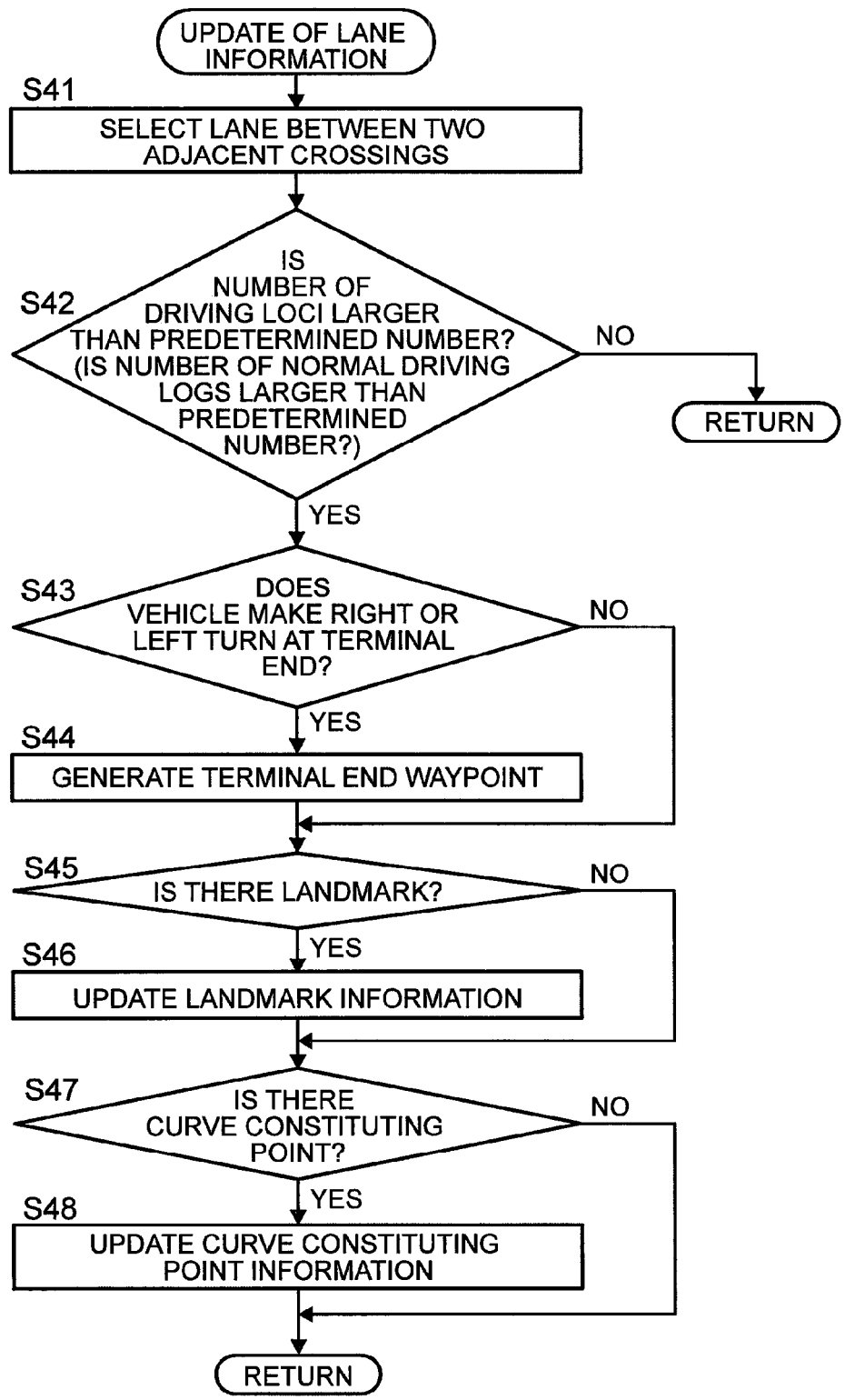
FIG. 13 is a view representing a process of updating the road map information accumulated in the road map information database through the use of the driving trajectory of the vehicle generated from the driving log, in the map information provision system according to the embodiment of the invention, in the form of a flowchart.

(v) Referring to a flowchart of FIG. 13 showing the flow of the process of updating road map information (lane information), the process of updating road map information described above may be performed according to the following procedure by the road map information correction unit. First of all, a lane to be updated between two adjacent nodes is selected (step 41), and it is then determined whether or not the number of recorded driving trajectories or the number of normal driving logs has reached the predetermined number, namely, whether or not the Fix condition is satisfied (step 42). If the Fix condition is not satisfied, road map information is not updated (return). On the other hand, if the Fix condition is satisfied, the process of generating the terminal end waypoint map is performed as described previously (step 44) in the case where the vehicle makes a right or left turn at the terminal end of the selected lane (step 43). Besides, in the case where there is a landmark in the selected lane (step 45), the process of updating landmark information (the landmark driving course distance) is performed as described previously (step 46). Then, in the case where there is a curve constituting point in the selected lane (step 47), the process of updating information on the curve constituting point (the change in angle and the curvature radius) is performed as described previously (step 48).

Thus, in the map information provision system according to the present embodiment, in simpler terms, the waypoint map as map information on the planned driving route of the vehicle that is utilized for driving support and driving control of the vehicle is provided by arranging the waypoints on the X-Y coordinates on the two-dimensional plane on which the distance is expressed as the driving course distance and the direction is expressed as the extension direction of the lane along the planned driving route, through the use of information on the crossings as described previously and information on the inter-crossing driving course distances, the curve constituting point driving course distances, and the changes in angle and curvature radii of the respective curve constituting points in each of the lanes and the like as road map information, as described already. Besides, the position of the vehicle on the map primarily depends on GPS information, but is accurately determined based on the position of a landmark when the landmark is detected. In this constructor, the position of the vehicle and the waypoints are each expressed relatively by the driving course distance from the arbitrarily set waypoint reference point and the extension direction of each lane, and the absolute three-dimensional positional coordinates at the respective spots of the roads are not indispensable. Therefore, the volume of data that are accumulated and processed in the invention is made much smaller than the volume of high-accuracy 3D map data, and the reduction of costs is also achieved. Besides, the waypoint map that is provided in the map information provision system according to the present embodiment is primarily configured through the use of the road map information that is obtained from car navigation map information. As a result, the accuracy of the road map information in use can be enhanced through the use of the information that is obtained when the vehicle actually drives on roads. Therefore, the system according to the present embodiment can provide map information on the planned driving route of the vehicle with higher accuracy than car navigation map information.

A first aspect of the invention is a system that constitutes and provides map information on a planned driving route of a vehicle to be utilized for driving support and/or driving control of the vehicle through the use of road map information. The system includes a road map information database, vehicle position determination means, road map information extraction means, and waypoint map constructor means. The road map information database accumulates the road map information including information on a latitude and a longitude that specify a position of each of a plurality of crossings present on roads, information on a road width, a number of lanes, a traveling direction of the vehicle in each of the lanes, positions of a front end and a rear end along the traveling direction of the vehicle at each of the crossings, information on an inter-crossing driving course distance as a driving course distance in each of the lanes between two adjacent ones of the crossings at each of the crossings, information on a curve constituting point driving course distance as a driving course distance from the front end of the closest crossing located behind in the traveling direction of the vehicle in the traveling direction of the vehicle to each of curve constituting points in each of the lanes, the information specifying a position of each of the curve constituting points, each of which is a spot on a curved road or a winding road as one of the roads, and information on a change in angle and a curvature radius of each of the curve constituting points in each of the lanes. The vehicle position determination means detects and determines a position of the vehicle on a road. The road map information extraction means extracts the road map information within a predetermined range around the position of the vehicle from the road map information database, based on the position of the vehicle. The waypoint map constructor means determines, based on a waypoint reference point as the position of the vehicle at an arbitrary time point and the extracted road map information, positions of waypoints that are arranged in front in the traveling direction of the vehicle at predetermined intervals along a planned driving route of the vehicle, through the use of waypoint coordinates as X-Y coordinates on a driving course distance plane, that is, a two-dimensional plane where the waypoint reference point serves as an origin, a distance is expressed as a driving course distance, and a direction is expressed as an extension direction of a lane along the planned driving route, and configures a waypoint map that is made up of the plurality of the waypoints. The waypoint map is supplied to a driving support device for the vehicle and/or a driving control device for the vehicle and is utilized as map information on the planned driving route.

In the above-mentioned constructor, "the road map information" generally means information on crossings on roads (on which the vehicle can drive), curve constituting points as spots on curved roads or winding roads, and the like as mentioned above, as accumulated in the road map information database. Incidentally, "the road map information" may include identification information (e.g., identification numbers or the like) for identifying the respective crossings, the respective lanes, the respective curve constituting points and the like. "The map information on the planned driving route of the vehicle" is information specifying the position of the route on which the vehicle is planned to drive. In the invention, as will be described later, the waypoint map that is configured through the use of "the road map information" that is accumulated in the road map information database is equivalent to "the map information on the planned driving route of the vehicle". "The planned driving route" may be set at appropriate timings by a driver of the vehicle, a user of the system or the like or "the driving support device for the vehicle and/or the driving control device for the vehicle" that will be described later. As described already, each of "the waypoints" is a spot on the route that should be passed by the vehicle in the case where the planned driving route of the vehicle is given (as set in a car navigation system or driving based on automatic driving) and the vehicle drives along the planned driving route. The waypoint map is the arrangement of the waypoints along the planned driving route of the vehicle. Each of the waypoints is typically arranged at a spot that is assumed to be the center of the lane on the planned driving route of the vehicle, based on the road map information. The waypoint map is extended along a line that is assumed to be a centerline of the lane. In the invention, "driving support and/or driving control for the vehicle" may be an arbitrary technology that utilizes the waypoint map to support the driving of the vehicle or control the driving of the vehicle, for example, an automatic driving technology for causing the vehicle to drive along the waypoint map, a driving support technology for leading or advising the driver to drive the vehicle such that the vehicle drives along the waypoint map, or the like. "The driving support device for the vehicle and/or the driving control device for the vehicle" may each be an arbitrary device that achieves the technology for supporting the driving of the vehicle or controlling the driving of the vehicle. "The driving course distance" means a distance that is actually covered by the vehicle. That is, "the driving course distance" refers to a net distance by which the vehicle moves along a road surface between two certain spots, in other words, a distance on a road in a three-dimensional space between two spots. Accordingly, for example, in the case where a road is inclined or curved between two spots, "the driving course distance" is longer than a distance on a two-dimensional map representing the two spots and the road therebetween as latitudes and longitudes, or a distance measured between the two spots along the road in the case where the two spots in the three-dimensional space are directly projected onto the two-dimensional plane. Incidentally, "the driving course distance" is used as a basic variable representing the length on the map of the system according to the invention. Each of "the crossings" may be a spot where at least two roads intersect with each other or merge with each other, namely, a trifurcate road, a T-junction, a crossroad, a penta-forked road or the like. As mentioned above, the road map information on each of "these crossings" may include information on the latitude and longitude of each of the crossings, the road width, the number of lanes, the traveling direction of the vehicle in each of the lanes, and the positions of front and rear ends along the traveling direction of the vehicle. In particular, it should be noted herein that the traveling direction of the vehicle may be any direction in which the vehicle can travel (a right turn, a left turn, straight traveling or the like). The rear end along the traveling direction of the vehicle means a position of entrance of the vehicle into the range of each of the crossings, and the front end along the traveling direction of the vehicle means a position of exit of the vehicle from the range of each of the crossings after making a right or left turn or traveling straight. In the case where there are a stop line, a crosswalk and the like (landmarks or the like) on a road surface in each of the crossings, the position of entrance of the vehicle into each of the crossings and the position of exit of the vehicle from each of the crossings may be determined as the positions of those landmarks. In the case where there are no such landmarks or the like, the position of entrance of the vehicle into each of the crossings and the position of exit of the vehicle from each of the crossings may be determined as a position where the curvature of the lane changes from a value equal to or smaller than a predetermined value to a value equal to or larger than the predetermined value along the traveling direction of the vehicle, and a position where the curvature of the lane changes from a value equal to or larger than the predetermined value to a value equal to or smaller than the predetermined value along the traveling direction of the vehicle, respectively. "The inter-crossing driving course distance" is "a driving course distance" in each of the lanes between the two adjacent crossings on the road. Incidentally, "the inter-crossing driving course distance" will hereinafter refer to the driving course distance from the front end of that one of the two adjacent crossings located on a leading end side (behind) in the traveling direction of the vehicle to the front end of the crossing located on a terminal end side (in front) in the traveling direction of the vehicle (see FIG. 2B) unless otherwise specified, but the invention is not limited thereto (e.g., "the inter-crossing driving course distance" may be the driving course distance between the rear ends of the two adjacent crossings in the traveling direction of the vehicle). Each of "the curve constituting points" is at least one spot that is arranged on a single road (i.e., a road between the two adjacent crossings) that is curved or winds (which is equivalent to a spot that may be referred to as "a link constituting point" in car navigation map information). As mentioned above, the road map information on each of "these curve constituting points" may include information on the change in angle and curvature radius of each of the lanes at each of the curve constituting points. It should be noted herein that "the change in angle" is an amount that is expressed as the direction and magnitude of the change in angle of rotation of a line linking each of the curve constituting points with the preceding curve constituting point to a line linking each of the curve constituting points with the subsequent curve constituting point along the traveling direction of the vehicle, and is equivalent to a change in yaw angle of the vehicle that is obtained by integrating (temporally integrating) the yaw rate from each of the curve constituting points to the subsequent curve constituting point (see FIG. 12A). As described above, "the curve constituting point driving course distance" is "the driving course distance" in each of the lanes from the front end of the closest crossing located behind in the traveling direction of the vehicle in the traveling direction of the vehicle to the curve constituting point. As described above, "the position of the vehicle" is a position where the vehicle is detected on the road. During the performance of driving support or driving control for causing the vehicle to drive along the waypoint map, "the position of the vehicle" is the current position of the vehicle unless otherwise specified. In the early stages after the start of driving, "the position of the vehicle" is detected by an arbitrary means that can be utilized to detect the position of the vehicle, for example, a GPS device or the like. As a result, as will be described later, when some landmark is detected after the start of the driving of the vehicle, "the position of the vehicle" is corrected and specified based on the position of the landmark. "The predetermined range around the position of the vehicle" is a range that may be appropriately set by the user of the system. For example, in the case of the automatic driving technology for causing the vehicle to drive along the waypoint map, the driving support technology for leading or advising the driver to drive the vehicle such that the vehicle drives along the waypoint map, or the like, "the predetermined range around the position of the vehicle" may be a range of about 400 m from the position of the vehicle in the traveling direction of the vehicle, or the like. "The waypoint reference point as the position of the vehicle at the arbitrary time point" is "the position of the vehicle" at a time point that may be appropriately selected by the user of the system. "The arbitrary time point" may typically be a time point when the vehicle first passes a crossing after the start of the driving of the vehicle at the time of the start of the driving of the vehicle (e.g., a time point when the vehicle reaches the front end along the traveling direction of the vehicle) or the like. "The predetermined intervals" at which the positions of the plurality of the waypoints are arranged in front in the traveling direction of the vehicle along the planned driving route of the vehicle may be appropriately set by the user or a designer of the system. For example, "the predetermined intervals" may be intervals of about 5 cm. As described above, "the waypoint coordinates" are X-Y coordinates representing the position of each of the waypoints on the two-dimensional plane where the waypoint reference point serves as the origin, the distance is expressed as the driving course distance, and the direction is expressed as the extension direction of each of the lanes along the planned driving route of the vehicle (referred to as "a driving course distance plane"). Accordingly, as will be described later in detail in the section of the embodiment, in the case where a plurality of waypoints are arranged along a certain lane, the distance between adjacent ones of the waypoints is a driving course distance, and the direction between adjacent ones of the waypoints coincides with the extension direction of the lane selected to cause the vehicle to drive. Incidentally, in the following description, the X-axis direction is defined as the traveling direction of the vehicle (the longitudinal direction) at the waypoint reference point, and the Y-axis direction is defined as the lateral direction of the vehicle, unless otherwise specified, but the invention is not limited thereto. Besides, the position of each of the waypoints may be determined through the use of "a waypoint driving course distance" as a cumulative driving course distance from the waypoint reference point as well as the waypoint coordinates. "The waypoint driving course distance" is a distance from the waypoint reference point to each of the waypoints along the road surface, namely, a distance on the road in the three-dimensional space.

In the constructor of the system according to the invention, as understood from the foregoing description, in simpler terms, after the position of the vehicle is detected, road map information within the predetermined range around the position of the vehicle is extracted from the road map information database, and the positions of the plurality of the waypoints that are arranged in front in the traveling direction of the vehicle along the planned driving route of the vehicle at the predetermined intervals are determined based on the position of the vehicle and the extracted road map information. Thus, the waypoint map as map information on the planned driving route is configured, and this waypoint map is supplied to the driving support device for the vehicle and/or the driving control device for the vehicle. The road map information mentioned above, which is extracted from the road map information database, includes a series of pieces of information on each of the crossings and information on the inter-crossing driving course distance, the curve constituting point driving course distance, and the change in angle and curvature radius of each of the curve constituting points in each of the lanes. Therefore, when these pieces of information are used, the position of each of the waypoints can be determined by "the waypoint coordinates" and/or "the waypoint driving course distance", namely, the driving course distance and the direction in which the route is curved or winds (the curvature of a single road or a right or left turn at each of the crossings) in configuring the waypoint map by joining the lanes along the planned driving route of the vehicle. Then, the waypoint map is expressed as the driving course distance and the direction in which the route is curved or winds. Thus, target values of forward and turning operation amounts of the vehicle, namely, target values of operation amounts of the vehicle in the longitudinal and lateral directions thereof are indicated. Therefore, the waypoint map can be utilized as map information on the planned driving route for automatic driving or driving support. Besides, the target value of the moving distance of the vehicle on the waypoint map is expressed as the driving course distance, so there is also an advantage in that there is no need to correct the distance on the map with the gradient of the road.

According to the above-mentioned constructor, first of all, the above-mentioned pieces of information are basically sufficient as the road map information that is needed to configure the waypoint map. Therefore, high-accuracy 3D map data are unnecessary, and the volume of accumulated data that are needed to configure the waypoint map can be held smaller. Accordingly, it is easy to initially introduce the map information provision system, and the costs of introduction are also expected to be held low. Then, a data storage can also be mounted in the vehicle, although the mounting thereof depends on the total volume of actual data.

Furthermore, among the pieces of road map information accumulated in the above-mentioned road map information database, the pieces of information on the latitude and longitude specifying the position of each of the plurality of the crossings, the road width at each of the crossings, the number of lanes, the traveling direction of the vehicle in each of the lanes, the positions of the front and rear ends along the traveling direction of the vehicle, and the change in angle and curvature radius of each of the curve constituting points in each of the lanes are directly available from common car navigation map information together with identification information on each of the crossings, each of the lanes and each of the curve constituting points. Besides, in common car navigation map information, information on the position (the latitude and longitude) of each of the curve constituting points, the gradient of the single road and the like is also further available. Therefore, after all, the inter-crossing driving course distance and the curve constituting point driving course distance can also be calculated through the use of car navigation map information. Thus, all the above-mentioned pieces of road map information accumulated in the road map information database can primarily be acquired from car navigation map information (with a certain level of accuracy). Accordingly, the above-mentioned system according to the invention makes it possible to configure and provide the waypoint map that covers a much more extensive road range than in the case where high-accuracy 3D map data are used, based on car navigation map information. Then, in the system according to the invention, the accuracy of the configured waypoint map can be enhanced as long as the accuracy of the above-mentioned pieces of information is enhanced. In fact, as will be described later, the road map information that is accumulated in the road map information database in the system according to the invention can be updated based on the information that is acquired while actually causing the vehicle to drive on the roads. Therefore, the system according to the invention makes it possible to configure and provide, based on common car navigation map information, the map information indicating the planned driving route of the vehicle, through the use of the road map information updated with higher accuracy than common car navigation map information.

In the above-mentioned system according to the invention, the position of the vehicle is also preferably specified by the driving course distance. In concrete terms, the position of the vehicle may be specified by the driving course distance from the front end of the closest crossing located behind in the traveling direction of the vehicle in the traveling direction of the vehicle. Accordingly, the vehicle position determination means may include vehicle driving course distance determination means for determining, based on the extracted map information, "the vehicle driving course distance" as the driving course distance from the front end of the closest crossing located behind in the traveling direction of the vehicle in the traveling direction of the vehicle to the position of the vehicle. The position of the vehicle is also determined in the unit of driving course distance, so the distance from the position of the vehicle to each of the waypoints is also expressed in the unit of driving course distance on the waypoint map. As a result, the accuracy of driving support or driving control of the vehicle along the waypoint map is expected to be enhanced. In this case, the waypoint map constructor means determines the waypoint coordinates of the plurality of the waypoints (or additionally, the waypoint driving course distance) through the use of the vehicle driving course distance, the driving course distance between the front and rear ends of each of the crossings present on the lane along the planned driving route along the traveling direction of the vehicle in the extracted road map information, the inter-crossing driving course distance between the respective crossings present on the lane along the planned driving route, the curve constituting point driving course distance to each of the curve constituting points present on the lane along the planned driving route, and the change in angle and curvature radius at each of the curve constituting points. That is, as described above, in the case where the waypoint map is configured by joining the lanes along the planned driving route of the vehicle, the position of the vehicle and each of the waypoints can be expressed through the use of "the waypoint coordinates" (or through the further use of "the waypoint driving course distance"). Besides, in this constructor, the position of the vehicle during the driving of the vehicle along the waypoints can also be specified by the vehicle driving course distance. Thus, the waypoint that is being passed by the vehicle can be specified by referring to the vehicle driving course distance.

Furthermore, in the above-mentioned system according to the invention, "a landmark driving course distance" that specifies the position of a landmark present on a road, namely, information on the driving course distance from the front end of the closest crossing located behind in the traveling direction of the vehicle in the traveling direction of the vehicle to the landmark may be preferably included in the road map information that is accumulated in the road map information database and that is extracted by the road map information extraction means. In this case, when the vehicle detects the landmark during the driving thereof, the vehicle driving course distance determination means may correct the vehicle driving course distance based on the landmark driving course distance to the detected landmark and the distance between the landmark and the vehicle. Incidentally, in this case, identification information identifying each landmark may be included in road map information.

In the above-mentioned system according to the invention, in configuring the waypoint map, the road map information around the position of the vehicle needs to be extracted after detecting and determining the position of the vehicle according to some method. For example, immediately after the start of the driving of the vehicle, the position of the vehicle is grasped through the use of information from the GPS device or the like, "the vehicle driving course distance" is determined based on positional information on the vehicle, and the waypoint map is configured through the use of "this vehicle driving course distance". However, if a landmark on a road (which may be selected from a group of, for example, stop lines on road surfaces, crosswalks, traffic lights, stop signs, speed limit signs and other road signs) is detected after the start of the driving of the vehicle and the position of the detected landmark is more accurately specified in road map information, the position of the vehicle on the map can be accurately specified based on the distance between the landmark and the vehicle, with reference to the position of the landmark. In this respect, the positional information on the landmark on the road as described above as well as identification information on the landmark is included in common car navigation map information. Therefore, from the information, "the landmark driving course distance", namely, the driving course distance from the front end of the closest crossing located behind in the traveling direction of the vehicle in the traveling direction of the vehicle to the landmark present on the road, which specifies the position of the landmark, can also be acquired.

Thus, in the system according to the invention, as described above, in the road map information database, the position of the landmark present on the road is specified by "the landmark driving course distance" and accumulated, and "the landmark driving course distance" is extracted at appropriate timings. When the vehicle detects this landmark, the vehicle driving course distance may be corrected based on "the landmark driving course distance" to the landmark and the distance between the landmark and the vehicle. Thus, the accuracy of the vehicle driving course distance representing the position of the vehicle with respect to each of the crossings on the planned driving route is improved, and the position of the vehicle during the driving thereof with respect to the waypoint map is more accurately determined. In concrete terms, the waypoint map between the respective crossings on the planned driving route is determined based on the inter-crossing driving course distance, and the position of the landmark is specified by the landmark driving course distance. Therefore, the position of the driving vehicle with respect to the waypoint map can be accurately determined by correcting the vehicle driving course distance as the distance from the crossing located behind in the traveling direction of the vehicle with reference to the detected landmark driving course distance, for example, performing a process of making the vehicle driving course distance coincident with its landmark driving course distance in passing the landmark, etc.

In other words, in the system according to the invention, in the aspect of detecting the position of the landmark and correcting the position of the vehicle based on the position, self-localize on the map is accurately achieved by the position of the detected landmark. Besides, the detection of the landmark can be achieved by a common sensor such as an in-vehicle camera, a radar or the like. In this aspect, therefore, there is also an advantage in that self-localize is possible at a relatively low price. Then, the position of the landmark is also specified by the driving course distance (from the front end of the closest crossing located behind in the traveling direction of the vehicle in the traveling direction of the vehicle). Thus, the post-correction position of the vehicle is easily expressed in the unit of driving course distance. Incidentally, as will be described later, the position of the landmark, namely, "the landmark driving course distance" can also be updated based on the map information that is acquired by detecting the presence of the landmark while actually causing the vehicle to drive on the roads. Accordingly, the system according to the invention makes it possible to configure and provide the more accurate map information indicating the planned driving route of the vehicle through the use of the road map information updated from car navigation map information, as to the position of the landmark as well.

In the above-mentioned system according to the invention, the road map information extraction means may be configured such that when road map information within a new range is extracted as the position of the vehicle moves, the waypoint map constructor means determines, based on the newly extracted road map information, the positions of new waypoints that are arranged in front in the traveling direction of the vehicle along the planned driving route of the vehicle at predetermined intervals (or through the further use of the waypoint driving course distance), and adds the determined positions of the new waypoints to the waypoint map. In this constructor, in the case where the planned driving route of the vehicle is given, the waypoint map is configured within each predetermined range around the current position of the vehicle, as mentioned already, instead of being configured at once over the entire region of the planned driving route. According to this constructor, the volume of data of the waypoint map configured at once is reduced, and a reduction in the processing load for configuring the waypoint map is accomplished.

Besides, in the above-mentioned constructor of the invention, when the driving travel distance of the vehicle exceeds a predetermined distance, the waypoint reference point may be updated to the position of the vehicle at an arbitrary time point afterward, and at the same time, the waypoint driving course distance may be reset as the waypoint reference point is updated. When the driving travel distance of the vehicle becomes long, the distance from the waypoint reference point to the position of the vehicle becomes long, and the values of "the waypoint coordinates" and "the waypoint driving course distance" become large. Thus, the accumulation of errors and an increase in the processing load of the system can be caused. Thus, as described above, when the driving travel distance of the vehicle exceeds the predetermined distance, the update of the waypoint reference point and the waypoint driving course distance are reset to eliminate the accumulation of errors and reduce the processing load of the system. In this respect, as described above, the waypoint reference point may be updated at an arbitrary time point that is set by the user or designer of the system after the driving travel distance of the vehicle exceeds the predetermined distance. The waypoint reference point may be preferably updated, for example, at the time point when the vehicle first passes a crossing (e.g., at the time point when the vehicle reaches the rear end along the traveling direction of the vehicle) etc. after the driving travel distance of the vehicle exceeds the predetermined distance.

By the way, the accuracy of the map information on the planned driving route of the vehicle, namely, the accuracy of the waypoint map depends on the accuracy of the road map information accumulated in the road map information database on which the waypoint map is based. In this respect, in the series of constructors of the above-mentioned system according to the invention, as mentioned already, the road map information that is accumulated in the road map information database in the system according to the invention can be updated based on the map information that is acquired by actually causing the vehicle to drive, for example, information on the positions of the respective crossings, the distances on the roads linking the crossings to one another, the change in angle and curvature radius of each curved road or each winding road, the positions of landmarks, and the like. Due to the update of this information, the enhancement of the accuracy of the road map information that is accumulated in the road map information database can be achieved. Then, due to the enhancement of the accuracy of road map information, the accuracy of the waypoint map that is supplied to the driving support device for the vehicle and/or the driving control device for the vehicle and that is utilized as map information on the planned driving route is also expected to be higher than in the case where only car navigation map information is used as road map information.

Thus, according to another aspect of the invention, one of the tasks of the invention is achieved by a system according to any one of the aspects that configures and provides map information on a planned driving route of the vehicle to be utilized for driving support and/or driving control of the vehicle through the use of road map information as described above. The system includes driving log recording means, driving trajectory generation means, and road map information correction means. The driving trajectory generation means includes lane leading end/terminal end position determination means and driving trajectory recording means. The driving log recording means records a driving log including an actual vehicle driving course distance as an actual driving distance from a driving trajectory reference point as the position of the vehicle at an arbitrary time point, a lateral deviation as a distance between a centerline of a lane in which the vehicle is driving and the position of the vehicle, a vehicle speed, and a yaw rate, at each of recording points that are arranged at predetermined intervals, during driving of the vehicle. The driving trajectory generation means generates a driving trajectory in an arbitrary lane between two arbitrary crossings that are adjacent to each other through the use of a normal driving log as the normal driving log that does not include an abnormal value in the lateral deviation and that relates to the vehicle that has driven by being driven by a driver himself or herself in a same direction in the arbitrary lane between the two arbitrary crossings that are adjacent to each other. The lane leading end/terminal end position determination means determines positions of a leading end and a terminal end of the arbitrary lane between the two arbitrary crossings that are adjacent to each other in the normal driving log, through the use of the actual vehicle driving course distance in the normal driving log, based on information on a position of a front end or rear end of each of the two arbitrary crossings that are adjacent to each other along a driving direction of the vehicle as accumulated in the road map information database, on a driving trajectory plane as a two-dimensional plane where the driving trajectory reference point serves as an origin, the distance is expressed as a driving course distance, and the direction is expressed as a direction in which the vehicle has driven. The driving trajectory recording means determines a position of a lane center point positioned on a centerline of the arbitrary lane between the leading and terminal ends of the arbitrary lane on the driving trajectory plane, by referring to the lateral deviation, the vehicle speed and the yaw rate, which have been recorded in the normal driving log, in such a manner as to correspond to each of the recording points of the normal driving log, and records a plurality of the positions of the lane center points as a driving trajectory between the leading and terminal ends of the arbitrary lane. The road map information correction means corrects the road map information accumulated in the road map information database, based on the driving trajectories whose number has reached a predetermined number, when a number of the driving trajectories in the arbitrary lane reaches the predetermined number.

In the above-mentioned constructor, first of all, "the actual vehicle driving course distance" included in "the driving log" that is recorded by "the driving log recording means", namely, the actual driving distance from "the driving trajectory reference point" may be given by the product of the vehicle speed at the time of the driving of the vehicle and the time. Alternatively, in general, each of wheel speed sensors that are installed in the vehicle generates a pulse signal as a corresponding one of wheels rotates. Therefore, the cumulative number of revolutions of the wheel is obtained by counting the number of such pulse signals, and "the actual vehicle driving course distance" (=the cumulative number of revolutions×2π×the radius of the wheel) is calculated from the cumulative number of revolutions and the radius of the wheel. Incidentally, as is the case with "the waypoint reference point", "the driving trajectory reference point" is "the position of the vehicle" at a time point that may be appropriately selected by the user of the system. "The arbitrary time point" may typically be a time point when the vehicle first passes a crossing after the start of the driving of the vehicle, at the time of the start of the driving of the vehicle (e.g., a time point when the vehicle reaches the front end along the traveling direction of the vehicle) or the like. In the case where the vehicle is caused to drive along the waypoint map, "the driving trajectory reference point" may be identical to "the waypoint reference point". As described above, "the lateral deviation" that is included in "the driving log" is a distance between the centerline of the lane in which the vehicle is driving and the position of the vehicle. "This lateral deviation" can be acquired by applying an arbitrary lane recognition algorithm to an image of the lane photographed by the in-vehicle camera, specifying the range of the lane and the centerline extending at the center thereof, and calculating the distance from the specified centerline of the lane to the position of the own vehicle. Besides, the angle of the longitudinal axis of the vehicle with respect to the extension direction of the lane ("the vehicle-lane deviation angle") may also be measured and recorded by using the arbitrary lane recognition algorithm as well as the above-mentioned "lateral deviation". "The vehicle speed" and "the yaw rate" may be measured by the wheel speed sensors and a gyro sensor, a yaw rate sensor or the like, which are installed in the vehicle, respectively. Incidentally, as described above, the respective parameters of the driving log are recorded at each of "the recording points" arranged at the predetermined intervals. It should be noted herein that "the predetermined intervals" may be time intervals or distance intervals that are set arbitrarily. That is, the driving log may be recorded at intervals of a predetermined time or at intervals of a predetermined driving distance during the driving of the vehicle. Besides, the driving log is recorded together with, for example, identification information on the crossings, the lanes and the like in an aspect that allows the crossings, the lanes and the like to be identified during driving. The information for identifying the crossings, the lanes and the like during driving may be acquired through the vehicle position determination means. For example, a timing of entrance into or exit from each of the crossings passed by the vehicle may be detected from a positional relationship between the vehicle and a landmark that is detected in or close to each of the crossings passed by the vehicle, and may be recorded in the driving log at that time point.

Subsequently, in the above-mentioned constructor, as described above, "the driving trajectory generation means" generates the driving trajectory in the arbitrary lane between the two arbitrary crossings that are adjacent to each other, through the use of "the normal driving logs", namely, the driving logs that do not include an abnormal value in the lateral deviation among "the driving logs of the vehicle that has driven by being driven by the driver himself or herself in the same direction in the arbitrary lane between the two arbitrary crossings that are adjacent to each other". It should be noted herein that "the arbitrary lane between the two arbitrary crossings that are adjacent to each other" may be a lane between two adjacent crossings arbitrarily selected by the driver of the vehicle or the user of the system or automatically selected by the system as appropriate, and may be specified by the identification information assigned to the crossings and the lane. "Driving by being driven by the driver himself or herself" means driving with the driver himself or herself performing the operation of steering, accelerating and decelerating the vehicle while gripping a steering wheel, instead of complete automatic driving for causing the vehicle to drive such that the position of the vehicle coincides with each of the waypoints on the way-point map. That is, in this case, the driver himself or herself carries out steering and operation assessing the surrounding situation. Therefore, the vehicle is expected to drive more appropriately, and typically, to drive substantially along the centerline of the lane. Each of "the driving logs that do not include an abnormal value in the lateral deviation" is a driving log recorded with no inconveniences such as abnormalities in sensors or the operation for avoiding obstacles on the driving route, or the like included. Thus, each of the driving logs referred to as "the normal driving logs" above means a driving log that is obtained when the vehicle drives substantially along the center of a certain lane between two certain crossings that are adjacent to each other.

Then, as described above, the above-mentioned "driving trajectory generation means" may be configured to determine the leading and terminal ends of the target lane on "the driving trajectory plane" by "the lane leading end/terminal end position determination means", and determine and record "the driving trajectory" between the leading and terminal ends of the lane on "the driving trajectory plane" by "the driving trajectory recording means", with a view to generating the driving trajectory in the lane between the two adjacent crossings. Incidentally, it should be noted herein that "the driving trajectory plane" is a two-dimensional plane where the driving trajectory reference point serves as the origin, and the distance is expressed as the driving course distance and the direction is expressed as the driving direction of the vehicle as is the case with the above-mentioned "driving course distance plane".

In more concrete terms, "the lane leading end/terminal end position determination means" may be configured to determine the positions of the leading and terminal ends of the lane between the two adjacent crossings whose respective parameters are recorded in each of "the normal driving logs" on the driving trajectory plane, through the use of the information on the position of the front end or rear end of each of the two adjacent crossings along the driving direction of the vehicle as accumulated in the road map information database and the actual vehicle driving course distance in each of the normal driving logs. In determining the positions of the leading and terminal ends of the lane between these two adjacent crossings, more specifically, in one aspect, when the actual in-crossing landmark driving course distance as the actual driving distance(s) from the driving trajectory reference point to a crosswalk and/or a stop line is further recorded as the driving log by the driving log recording means in the case where the crosswalk and/or the stop line exist(s) in the two arbitrary crossings that are adjacent to each other, the lane leading end/terminal end position determination means may determine the position of the leading end or terminal end of the arbitrary lane, as a position obtained by adding the actual in-crossing landmark driving course distance to the distance between the position(s) of the crosswalk and/or the stop line detected in each of the crossings and the position of the front end along the traveling direction of the vehicle. Besides, in another aspect, the lane leading end/terminal end position determination means may determine the position of the leading end or terminal end of the arbitrary lane, as a position where the curvature obtained by dividing the yaw rate by the vehicle speed along the traveling direction of the vehicle in the two arbitrary crossings that are adjacent to each other changes from a value equal to or larger than a predetermined value to a value equal to or smaller than the predetermined value (in this aspect, the position of the leading end or terminal end of the lane can be determined in the case where the target lane makes a right or left turn in the traveling direction of the vehicle in the crossings).

As described above, "the driving trajectory recording means" first determines the lane center point positioned on the centerline of the lane between the leading and terminal ends of the lane as determined by "the lane leading end/terminal end position determination means" on the driving trajectory plane, in such a manner as to correspond to each of the recording points, with reference to the lateral deviation, vehicle speed and yaw rate in each of the normal driving logs. In determining the lane center point, more specifically, the coordinates of the position of the vehicle and the yaw angle thereof on the driving trajectory plane as viewed from the driving trajectory reference point at each of the recording points are first calculated through the use of the vehicle speed and the yaw rate, and the coordinates of the lane center point present at the position obtained by displacing the position of the vehicle by the lateral deviation on the driving trajectory plane are then calculated based on the coordinates of the position of the vehicle, the yaw angle and the lateral deviation, as will be described later in the section of the embodiment. Incidentally, the vehicle-lane deviation angle may also be used in calculating the lane center point. Then, the positions of a plurality of lane center points are recorded as "the driving trajectory" between the leading and terminal ends in the selected lane. It should be noted herein that the driving trajectory generated and recorded by the lane center points is expected to be a trajectory substantially along the center of the lane in which the vehicle has actually drive (in the present specification, "the driving trajectory" does not mean the trajectory of the position actually passed by the vehicle, but the extension route of the centerline of the lane in which the vehicle has actually drive as derived therefrom, namely, the trajectory of the center of the lane obtained through the actual driving of the vehicle). Accordingly, the driving trajectory generated and recorded herein can be assumed to extend along the center of the lane with higher accuracy than on the waypoint map generated, based on the information accumulated in the road map information database, on the assumption that the vehicle passes the center of the lane. Thus, more accurate information on the route along which the lane extends is obtained by using this driving trajectory.

As described above, "the road map information correction means" in the constructor of the above-mentioned system according to the invention corrects the road map information accumulated in the road map information database based on the driving trajectories whose number has reached a predetermined number, when the number of driving trajectories (which are expected to provide more accurate information) in the arbitrary lane reaches the predetermined number. The road map information is not corrected until the number of driving trajectories in the arbitrary lane reaches the predetermined number, because of the following reason. The accuracy of post-correction road map information is enhanced as the number of driving trajectories used for correction increases. As a result, when the number of driving trajectories used for correction reaches the predetermined number, the correction of map information with sufficient accuracy can be achieved.

The correction of road map information by "the road map information correction means" may be achieved in various aspects. In one of the aspects, the driving trajectory generation means includes means for calculating the length of the driving trajectory between the leading and terminal ends of the arbitrary lane between the two arbitrary crossings that are adjacent to each other, as an actual inter-crossing driving course distance in the arbitrary lane between the two arbitrary crossings that are adjacent to each other. "The road map information correction means" may be configured to update the inter-crossing driving course distance in the arbitrary lane between the two arbitrary crossings that are adjacent to each other as accumulated in the road map information database, to the average of the inter-crossing driving course distances on the driving trajectories whose number has reached the predetermined number. That is, the inter-crossing driving course distance in the lane between the two adjacent crossings is updated to the distance measured by actually causing the vehicle to drive in the lane. It should be noted herein that the updated inter-crossing driving course distance is the average of the inter-crossing driving course distances on the driving trajectories whose number has reached the predetermined number as measured by actually causing the vehicle to drive in the lane as described above, and is therefore expected to be more accurate than the value calculated from the information that is obtained from car navigation map information.

Besides, in another one of the aspects of the correction of road map information by "the road map information correction means", the starting position of a right or left turn and the angle and curvature radius of a range of the right or left turn at the crossing located on the terminal end side in the arbitrary lane between the two arbitrary crossings that are adjacent to each other may be updated through the use of the driving trajectory measured by actually causing the vehicle to drive in the lane. In this aspect, concretely, the road map information correction means may be configured to include means for calculating averages of angles and curvature radii within a range of a right or left turn in the driving trajectories whose number has reached the predetermined number, based on a vehicle speed and yaw rate of the vehicle in the crossing on a terminal end side in the driving trajectories whose number has reached the predetermined number, in a case where the number of driving trajectories where the vehicle makes the right or left turn at the crossing on the terminal end side of the arbitrary lane between the two arbitrary crossings that are adjacent to each other reaches the predetermined number, means for configuring a waypoint map in the crossing on the terminal end side through the use of the calculated averages of the angles and curvature radii within the range of the right or left turn of the vehicle and road map information on the crossing on the terminal end side as accumulated in the road map information database, means for matching the position of the stop line in each of the driving trajectories in the crossing on the terminal end side whose number has reached the predetermined number with the position of the stop line in the waypoint map in the crossing on the terminal end side, matching an orientation of a route immediately preceding the right or left turn of the vehicle in each of the driving trajectories in the crossing on the terminal end side with an orientation of a route immediately preceding the right or left turn of the vehicle on the waypoint map in the crossing on the terminal end side, and determining a starting position of the right or left turn on the waypoint map in the crossing on the terminal end side at a time when the position of the waypoint map in the crossing on the terminal end side is translated such that a sum of squares of a deviation between a route after the right or left turn of the vehicle on the waypoint map in the crossing on the terminal end side and a route after the right or left turn of the vehicle on each of the driving trajectories in the crossing on the terminal end side is minimized, as the starting position of the right or left turn in the crossing on the terminal end side, and means for updating road map information on the crossing on the terminal end side as accumulated in the road map information database, through the use of the position specified as the starting position of the right or left turn in the crossing on the terminal end side, and the averages of the angles and curvature radii within the range of the right or left turn of the vehicle. This constructor can make the accuracy of the road map information on the starting positions, angles and curvature radii of the winding at crossings that are important when the vehicle makes a right or left turn higher than the accuracy of the values calculated from the information that is obtained from car navigation map information.

Furthermore, in the above-mentioned system according to the invention, in the case where information indicating the presence of a curve constituting point in association with the actual vehicle driving course distance when the curve constituting point is detected during the driving of the vehicle is included as the driving log that is recorded by the driving log recording means, in addition to the actual vehicle driving course distance, the lateral deviation, the vehicle speed and the yaw rate, the road map information correction means may be configured, when the number of normal driving logs reaches a predetermined number, to update the change in angle and curvature radius of the curve constituting point commonly detected in the normal driving logs whose number has reached the predetermined number as recorded in the road map information database, based on the change in angle and curvature radius that are determined from the vehicle speed and the yaw rate within a predetermined distance range from the corresponding curve constituting point in each of the normal driving logs whose number has reached the predetermined number along the driving direction of the vehicle. In this case, the road map information correction means may directly obtain the changes in angle and curvature radii of the curve constituting points detected during the driving of the vehicle from the normal driving logs. Alternatively, the road map information correction means may generate the driving trajectory from the normal driving logs as described above, and derive the changes in angle and curvature radii of the curve constituting points from the generated driving trajectories According to this constructor, the changes in angle and curvature radii of the curve constituting points that are accumulated in the road map information database in the system according to the invention can be updated to more accurate values than the values calculated from the information that is obtained from car navigation map information.

In the embodiment of the above-mentioned aspect of updating the road map information on the curve constituting points, in more concrete terms, the curvature radius of the curve constituting point commonly detected in the normal driving logs whose number has reached the predetermined number as recorded in the road map information database may be updated to the average of the curvature radii that are obtained by dividing the vehicle speeds by the yaw rates in the normal driving logs whose number has reached the predetermined number within the predetermined distance range from the corresponding curve constituting point along the driving direction of the vehicle, in the normal driving logs whose number has reached the predetermined number, by the road map information correction means. Besides, the change in angle of the curve constituting point commonly detected in the normal driving logs whose number has reached the predetermined number as recorded in the road map information database may be updated to the average of changes in yaw angle of the vehicle that are obtained by integrating the yaw rates in the normal driving logs whose number has reached the predetermined number from the corresponding curve constituting point to the subsequent curve constituting point, in the normal driving logs whose number has reached the predetermined number.

Still further, in the above-mentioned system according to the invention, in the case where information on the landmark driving course distance to a landmark present on a road is included in the road map information that is accumulated in the road map information database and that is extracted by the road map information extraction means, the information on the landmark driving course distance to this landmark may also be updated based on the detected information on the landmark that is acquired by actually causing the vehicle to drive. Thus, in the above-mentioned system according to the invention, in the case where the driving log recording means includes information indicating the presence of a landmark in association with the actual vehicle driving course distance at the time of detection of the landmark during the driving of the vehicle in addition to the actual vehicle driving course distance and the lateral deviation as the driving log, when the number of normal driving logs as driving logs that do not include an abnormal value in the lateral deviation and that relate to the vehicle that has driven by being driven by the driver himself or herself in the same direction in the arbitrary lane between the two arbitrary crossings that are adjacent to each other reaches a predetermined number, the road map information correction means may update the landmark driving course distance to the landmark commonly detected in the normal driving logs whose number has reached the predetermined number as recorded in the road map information database, to an average of values each obtained by subtracting the actual vehicle driving course distance from the landmark to the front end of the closest crossing located behind in the traveling direction of the vehicle in the traveling direction of the vehicle from the actual vehicle driving course distance at the time of detection of the landmark in the normal driving logs whose number has reached the predetermined number. In this case, the road map information correction means may directly obtain the landmark driving course distance to the landmark detected during the driving of the vehicle from the normal driving logs (may generate the driving trajectory from the normal driving logs as described above and derive the landmark driving course distance from the generated driving trajectory). This constructor makes it possible to update the landmark driving course distance that is accumulated in the road map information database in the system according to the invention to a more accurate value than the value calculated from information that is obtained from car navigation map information.

Incidentally, in the above-mentioned constructor, the road map information correction means may be configured, in a case where there are a plurality of landmarks in the arbitrary lane between the two arbitrary crossings that are adjacent to each other, to update the landmark driving course distance to one of the second and following landmarks from the crossing on a leading end side of the arbitrary lane as recorded in the road map information database, to a distance that is given by adding the landmark driving course distance to the preceding landmark from the crossing on the leading end side to an actual driving distance between the landmark and the preceding landmark from the crossing on the leading end side. The detection of the presence of the landmarks and the measurement of the driving course distances among the landmarks can be relatively accurately achieved during the actual driving of the vehicle. Therefore, according to the above-mentioned aspect, there is an advantage in that the relative distances among the landmarks can be accurately accumulated even in the case where the accuracy of the position of the front end of each of the crossings in the traveling direction of the vehicle is low.

Thus, in the above-mentioned invention, in one aspect, the waypoint map that is also utilized in driving support such as automatic driving or the like or driving control of the vehicle is configured and provided as map information on the planned driving route of the vehicle, from the information on the position of the vehicle and the road map information that is extracted from the road map information database in which the road map information available from car navigation map information is accumulated. As mentioned already, the road range that is covered by car navigation map information is much more extensive than the high-accuracy 3D map data. Therefore, the system according to the invention is expected to be utilized in driving support such as automatic driving or the like or driving control of the vehicle in a more extensive range.

Besides, it should be understood in the system according to the invention that the information representing each distance is provided as the driving course distance between two certain points such as "the inter-crossing driving course distance", "the curve constituting point driving course distance", "the vehicle driving course distance", "the landmark driving course distance" or the like in the road map information that is supplied from the road map information database to configure the waypoint map. That is, in the road map information in the system according to the invention, the positional information is expressed as the relative distance and bearing from a certain arbitrary reference point, instead of absolute positional coordinates. In configuring the waypoint map, the distance to each of the waypoints is determined by adding relative distances in the information on "the inter-crossing driving course distance", "the curve constituting point driving course distance", "the vehicle driving course distance" and "the landmark driving course distance", and the bearing in which the respective waypoints are arranged is determined along the extension direction of each of the lanes. According to this constructor, only the information that is needed to specify the relative distances and directions should be accumulated in the road map information database as already mentioned above, and the absolute three-dimensional positional coordinates of the respective spots on the roads as in the case of high-accuracy 3D map data are not indispensable. Therefore, the volume of data that are accumulated and processed in the invention is made significantly smaller than the volume of high-accuracy 3D map data, and the reduction of costs is also achieved. Then, in the system according to the invention, the accuracy of the road map information that is provided from the road map information database to configure the waypoint map can be enhanced based on the map information that is acquired by actually causing the vehicle to drive, as described already. Accordingly, it can be concluded that the system according to the invention is configured such that the map information that is more accurate than the information that is obtained from car navigation map information can be provided on the premise that car navigation map information is utilized.

The above-mentioned series of systems according to the invention may be structured by an in-vehicle device, or may be structured by a device outside the vehicle such that the information required for driving support and/or driving control of the vehicle is provided to the vehicle through communication. Besides, the process regarding the update of the road map information that is accumulated in the road map information database may also be performed by either an in-vehicle device or a device outside the vehicle.

The invention claimed is:

1. A map information provision system comprising:
a central processing unit (CPU), and
a road map information database configured to store road map information including
information on a latitude and a longitude that specifies a position of each of a plurality of crossings present on roads,
information on a road width, a number of lanes, a traveling direction of a vehicle in each of the lanes, positions of a front end and a rear end along the traveling direction of the vehicle at each of the crossings,
information on an inter-crossing driving course distance as a driving course distance in each of the lanes between two adjacent ones of the crossings, at each of the crossings,
information on a curve constituting point driving course distance as a driving course distance from the front end of the closest crossing located behind in the traveling direction of the vehicle in the traveling direction of the vehicle to each of curve constituting points in each of the lanes, the information specifying a position of each of the curve constituting points, each of which is a spot on a curved road or a winding road as one of the roads, and
information on a change in angle and a curvature radius of each of the curve constituting points in each of the lanes,
the CPU being configured to:
detect and determine a position of the vehicle on a road;
extract the road map information around the vehicle from the road map information database, based on the position of the vehicle;
determine, based on a waypoint reference point as the position of the vehicle at an arbitrary time point and the extracted road map information, positions of waypoints that are arranged in front in the traveling direction of the vehicle at predetermined intervals along a planned driving route of the vehicle, through use of waypoint coordinates as X-Y coordinates on a driving course distance plane, that is, a two-dimensional plane where the waypoint reference point serves as an origin, a distance is expressed as a driving course distance, and a direction is expressed as an extension direction of a lane along the planned driving route, and configure a waypoint map that is made up of the plurality of the waypoints; and
control driving of the vehicle by utilizing the waypoint map as map information on the planned driving route.

2. The map information provision system according to claim 1, wherein
the CPU is further configured to:
determine, based on the extracted map information, a vehicle driving course distance as a driving course distance from the front end of the closest crossing located behind in the traveling direction of the vehicle in the traveling direction of the vehicle to the position of the vehicle,
specify the position of the vehicle by the vehicle driving course distance, and
determine the waypoint coordinates of the plurality of the waypoints through use of the vehicle driving course distance, a driving course distance between the front end and the rear end along the traveling direction of the vehicle at each of the crossings present on the lanes along the planned driving route in the extracted road map information, inter-crossing driving course distances among the respective crossings present in the lanes along the planned driving route, curve constituting point driving course distances to the curve constituting points present in the lanes along the planned driving route, and changes in angle and curvature radii of the curve constituting points.

3. The map information provision system according to claim 2, wherein
the road map information includes information on a landmark driving course distance as a driving course distance from the front end of the closest crossing located behind in the traveling direction of the vehicle in the traveling direction of the vehicle to a landmark present on a road, the information specifying a position of the landmark, and
the CPU is further configured to correct the vehicle driving course distance based on the landmark driving course distance to the landmark and a distance between the landmark and the vehicle, when the vehicle detects the landmark.

4. The map information provision system according to claim 3, wherein
the landmark is at least one of a stop line on a road surface, a crosswalk, a traffic light, a stop sign, and a speed limit sign.

5. The map information provision system according to claim 1, wherein
the CPU is further configured to determine, based on newly extracted road map information, positions of new waypoints that are arranged in front in the traveling direction of the vehicle at predetermined intervals along the planned driving route of the vehicle, through use of the waypoint coordinates, and add the positions of the new waypoints to the waypoint map, when the CPU extracts the road map information within a new range as the position of the vehicle moves.

6. The map information provision system according to claim 1, wherein
the CPU is further configured to update the waypoint reference point to a position of the vehicle afterward at an arbitrary time point, when a driving travel distance of the vehicle exceeds a predetermined distance.

7. The map information provision system according to claim 1, wherein
the CPU is further configured to determine a position of each of the waypoints through use of the waypoint coordinates and a waypoint driving course distance as a cumulative driving course distance from the waypoint reference point.

8. The map information provision system according to claim 3, wherein
the CPU is further configured to determine, based on newly extracted road map information, positions of new waypoints that are arranged in front in the traveling direction of the vehicle at predetermined intervals along the planned driving route of the vehicle, through use of the waypoint coordinates, and add the positions of the new waypoints to the waypoint map, when the CPU extracts the road map information within a new range as the position of the vehicle moves.

9. The map information provision system according to claim 3, wherein
the CPU is further configured to update the waypoint reference point to a position of the vehicle afterward at an arbitrary time point, when a driving travel distance of the vehicle exceeds a predetermined distance.

10. The map information provision system according to claim 3, wherein
the CPU is further configured to determine a position of each of the waypoints through use of the waypoint coordinates and a waypoint driving course distance as a cumulative driving course distance from the waypoint reference point.

11. The map information provision system according to claim 1, wherein the CPU is further configured to:
record a driving log including an actual vehicle driving course distance as an actual driving distance from a driving trajectory reference point as the position of the vehicle at an arbitrary time point, a lateral deviation as a distance between a centerline of a lane in which the vehicle is driving and the position of the vehicle, a vehicle speed, and a yaw rate, at each of recording points that are arranged at predetermined intervals, during driving of the vehicle;
generate a driving trajectory in an arbitrary lane between two arbitrary crossings that are adjacent to each other through use of a normal driving log as the driving log that does not include an abnormal value in the lateral deviation and that relates to the vehicle that has driven by being driven by a driver in a same direction in the arbitrary lane between the two arbitrary crossings that are adjacent to each other;
determine positions of a leading end and a terminal end of the arbitrary lane between the two arbitrary crossings that are adjacent to each other in the normal driving log, through use of the actual vehicle driving course distance in the normal driving log, based on information on a position of a front end or rear end of each of the two arbitrary crossings that are adjacent to each other along a driving direction of the vehicle as accumulated in the road map information database, on a driving trajectory plane as a two-dimensional plane where the driving trajectory reference point serves as an origin, the distance is expressed as a driving course distance, and the direction is expressed as a direction in which the vehicle has driven;
determine a position of a lane center point positioned on a centerline of the arbitrary lane between the leading and terminal ends of the arbitrary lane on the driving trajectory plane, by referring to the lateral deviation, the vehicle speed and the yaw rate, which have been recorded in the normal driving log, in such a manner as to correspond to each of the recording points of the normal driving log, and record a plurality of the positions of the lane center points as a driving trajectory between the leading and terminal ends of the arbitrary lane; and
correct the road map information accumulated in the road map information database, based on the driving trajectories whose number has reached a predetermined number, when a number of the driving trajectories in the arbitrary lane has reached the predetermined number.

12. The map information provision system according to claim 11, wherein the CPU is further configured to:
calculate a length of the driving trajectory between the leading and terminal ends of the arbitrary lane between the two arbitrary crossings that are adjacent to each other, as an actual inter-crossing driving course distance in the arbitrary lane between the two arbitrary crossings that are adjacent to each other, and
update the inter-crossing driving course distance in the arbitrary lane between the two arbitrary crossings that are adjacent to each other as accumulated in the road map information database, to an average of the actual inter-crossing driving course distances on the driving trajectories whose number has reached the predetermined number.

13. The map information provision system according to claim 8, wherein the CPU is further configured to:
   record a driving log including am actual vehicle driving course distance as an actual driving distance from a driving trajectory reference point as a position of the vehicle at an arbitrary time point, a lateral deviation as a distance between a centerline of a lane in which the vehicle is driving and the position of the vehicle, and information indicating a presence of a landmark in association with the actual vehicle driving course distance when the vehicle detects the landmark, during driving of the vehicle; and
   update the landmark driving course distance to a landmark commonly detected in a normal driving logs whose number has reached a predetermined number as recorded in the road map information database, to an average of values each obtained by subtracting the actual vehicle driving course distance from the landmark to the front end of the closest crossing located behind in the traveling direction of the vehicle in the traveling direction of the vehicle from the actual vehicle driving course distance at a time when the landmark is detected in the normal driving logs whose number has reached the predetermined number, when the number of normal driving logs, which are driving logs each of which does not include an abnormal value in the lateral deviation and relates to the vehicle that has driven by being driven by a driver in the same direction in an arbitrary lane between two arbitrary crossings that are adjacent to each other, reaches the predetermined number.

14. The map information provision system according to claim 13, wherein
   the CPU is further configured to, in a case where there are a plurality of landmarks in the arbitrary lane between the two arbitrary crossings that are adjacent to each other, update the landmark driving course distance to one of the second and following landmarks from the crossing on a leading end side of the arbitrary lane as recorded in the road map information database, to a distance that is given by adding the landmark driving course distance to a preceding landmark from the crossing on the leading end side to an actual driving distance between the landmark and the preceding landmark from the crossing on the leading end side.

15. The map information provision system according to claim 1, wherein the CPU is further configured to:
   record a driving log including an actual vehicle driving course distance as an actual driving distance from a driving trajectory reference point as a position of the vehicle at an arbitrary time point, a lateral deviation as a distance between a centerline of a lane in which the vehicle is driving and the position of the vehicle, a vehicle speed of the vehicle, a yaw rate of the vehicle, and information indicating presence of a curve constituting point in association with the actual vehicle driving course distance when the curve constituting point is detected during driving of the vehicle; and
   update a change in angle and a curvature radius of a curve constituting point commonly detected in normal driving logs whose number has reached a predetermined number as recorded in the road map information database, based on a change in angle and a curvature radius that are determined from the vehicle speed and the yaw rate within a predetermined distance range from a corresponding curve constituting point in each of the normal driving logs whose number has reached the predetermined number along a driving direction of the vehicle, when the number of normal driving logs, which are driving logs each of which does not include an abnormal value in the lateral deviation and relates to the vehicle that has driven by being driven by a driver himself or herself in the same direction in an arbitrary lane between two arbitrary crossings that are adjacent to each other, reaches the predetermined number.

16. The map information provision system according to claim 15, wherein
   the CPU is further configured to
      update the curvature radius of the curve constituting point commonly detected in the normal driving logs whose number has reached the predetermined number as recorded in the road map information database, to an average of curvature radii that are each obtained by dividing the vehicle speed by the yaw rate in the normal driving logs whose number has reached the predetermined number within the predetermined distance range from the corresponding curve constituting point along the driving direction of the vehicle, in the normal driving logs whose number has reached the predetermined number, and
      update a change in angle of the curve constituting point commonly detected in the normal driving logs whose number has reached the predetermined number as recorded in the road map information database, to an average of changes in yaw angle of the vehicle, which are each obtained by integrating yaw rates in the normal driving logs whose number has reached the predetermined number from the corresponding curve constituting point to a subsequent curve constituting point, in the normal driving logs whose number has reached the predetermined number.

17. The map information provision system according to claim 11, wherein the CPU is further configured to:
   record an actual in-crossing landmark driving course distance, that is, an actual driving distance from the driving trajectory reference point to a crosswalk or a stop line, as the driving log, in a case where the crosswalk or the stop line exists in the two arbitrary crossings that are adjacent to each other, and
   determine the position of the leading end or terminal end of the arbitrary lane as a position that is obtained by adding the actual in-crossing landmark driving course distance to a distance between a position of the crosswalk or stop line detected in the crossings and the position of the front end along the traveling direction of the vehicle.

18. The map information provision system according to claim 11, wherein
   the CPU is further configured to determine the position of the leading end or terminal end of the arbitrary lane, as a position where the curvature that is obtained by dividing the yaw rate by the vehicle speed along the traveling direction of the vehicle in the two arbitrary crossings that are adjacent to each other changes from a value equal to or larger than a predetermined value to a value equal to or smaller than the predetermined value.

19. The map information provision system according to claim 11, wherein
   the CPU is further configured to
      calculate averages of angles and curvature radii within a range of a right or left turn of the vehicle in the driving trajectories whose number has reached a predetermined number, respectively, based on a vehicle speed and yaw rate of the vehicle in the crossing on a terminal end side in the driving trajectories whose number has reached the predetermined number, in a case where the number of driving trajectories where the vehicle makes the right or left turn at the crossing on the terminal end side of the arbitrary lane between the two arbitrary crossings that are adjacent to each other reaches the predetermined number, configure a waypoint map in the crossing on the terminal end side through use of the calculated averages of the angles and curvature radii within the range of the right or left turn of the vehicle and road map information on the crossing on the terminal end side as accumulated in the road map information database, match the position of a stop line in each of the driving trajectories in the crossing on the terminal end side whose number has reached the predetermined number with the position of the stop line in the waypoint map in the crossing on the terminal end side, match an orientation of a route immediately preceding the right or left turn of the vehicle in each of the driving trajectories in the crossing on the terminal end side with an orientation of a route immediately preceding the right or left turn of the vehicle on the waypoint map in the crossing on the terminal end side, and determine a starting position of the right or left turn on the waypoint map in the crossing on the terminal end side at a time when the position of the waypoint map in the crossing on the terminal end side is translated such that a sum of squares of a deviation between a route after the right or left turn of the vehicle on the waypoint map in the crossing on the terminal end side and a route after the right or left turn of the vehicle on each of the driving trajectories in the crossing on the terminal end side is minimized, as the starting position of the right or left turn in the crossing on the terminal end side, and update road map information on the crossing on the terminal end side as accumulated in the road map information database, through use of the position specified as the starting position of the right or left turn in the crossing on the terminal end side, and the averages of the angles and curvature radii within the range of the right or left turn of the vehicle.

\* \* \* \* \*